United States Patent
Katsuta et al.

(10) Patent No.: US 9,236,023 B2
(45) Date of Patent: *Jan. 12, 2016

(54) LIQUID CRYSTAL DISPLAY DEVICE, DRIVING METHOD, AND DISPLAY APPARATUS

(75) Inventors: Shohei Katsuta, Osaka (JP); Tsuyoshi Kamada, Osaka (JP); Seiji Ohhashi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 382 days.

This patent is subject to a terminal disclaimer.

(21) Appl. No.: 13/823,234

(22) PCT Filed: Sep. 22, 2011

(86) PCT No.: PCT/JP2011/071707
§ 371 (c)(1),
(2), (4) Date: Mar. 14, 2013

(87) PCT Pub. No.: WO2012/043408
PCT Pub. Date: Apr. 5, 2012

(65) Prior Publication Data
US 2013/0181985 A1    Jul. 18, 2013

(30) Foreign Application Priority Data

Sep. 29, 2010   (JP) ................................ 2010-219710

(51) Int. Cl.
*G09G 3/36*   (2006.01)
*H04N 5/66*   (2006.01)
(Continued)

(52) U.S. Cl.
CPC .............. *G09G 3/3696* (2013.01); *G03B 35/26* (2013.01); *G09G 3/3648* (2013.01); *H04N 5/66* (2013.01); *G02F 2001/134345* (2013.01); *H04N 13/0434* (2013.01)

(58) Field of Classification Search
CPC .............. G09G 3/3648; G09G 3/3696; G09G 2300/08; G09G 2300/0804; G09G 2300/0809; G09G 2320/0209; G03B 35/26; G02F 2001/134345; H04N 13/0434
USPC .......................................... 345/87, 90, 92, 94
See application file for complete search history.

(56) References Cited

U.S. PATENT DOCUMENTS 8,638,359 B2 *  1/2014  Kim et al. ........................ 348/51
9,013,388 B2 *  4/2015  Katsuta et al. .................. 345/92
(Continued)

FOREIGN PATENT DOCUMENTS

JP   2008-287021 A   11/2008
JP   2010-204389 A    9/2010
(Continued)

OTHER PUBLICATIONS

Official Communication issued in International Patent Application No. PCT/JP2011/071707 mailed on Oct. 25, 2011.
(Continued)

*Primary Examiner* — Jimmy H Nguyen
(74) *Attorney, Agent, or Firm* — Keating & Bennett, LLP

(57) ABSTRACT

A liquid crystal display device (1) includes a plurality of pixels disposed in a matrix form. The liquid crystal display device (1) is driven such that, after a common data voltage is applied to liquid crystal layers of sub pixels disposed in each of the pixels, the transmittance of the liquid crystal layer of a sub pixel which is positioned closest to a boundary between a retarder plate (RR) and a retarder plate (RL) will be decreased. The maximum value of the transmittance of the liquid crystal layers of the sub pixels in a first display mode is smaller than that in a second display mode.

6 Claims, 12 Drawing Sheets

(51) Int. Cl.
*G03B 35/26* (2006.01)
*H04N 13/04* (2006.01)
*G02F 1/1343* (2006.01)

(56) References Cited

U.S. PATENT DOCUMENTS

2008/0284931 A1 11/2008 Kimura
2010/0225682 A1 9/2010 Nakahata
2010/0265230 A1 10/2010 Kang
2012/0086743 A1 4/2012 Shiomi

FOREIGN PATENT DOCUMENTS

JP 2010-250257 A 11/2010
WO 2010/143348 A1 12/2010

OTHER PUBLICATIONS

Kang et al., "A Novel Polarizer Glasses-type 3D Displays with a Patterned Retarder", SID 10 Digest, 2010, pp. 1-4.
Katsuta et al.; "Liquid Crystal Display Device and Display Apparatus"; U.S. Appl. No. 13/823,146, filed Mar. 14, 2013.

* cited by examiner

FIG. 5
(a) LUT1
| TONE LEVEL | DATA VOLTAGE [V] |
|---|---|
| 0 | 0.000 |
| 32 | 2.383 |
| 64 | 2.614 |
| 96 | 2.865 |
| 128 | 3.132 |
| 160 | 3.482 |
| 192 | 4.005 |
| 224 | 5.170 |
| 255 | 7.600 |
(b) 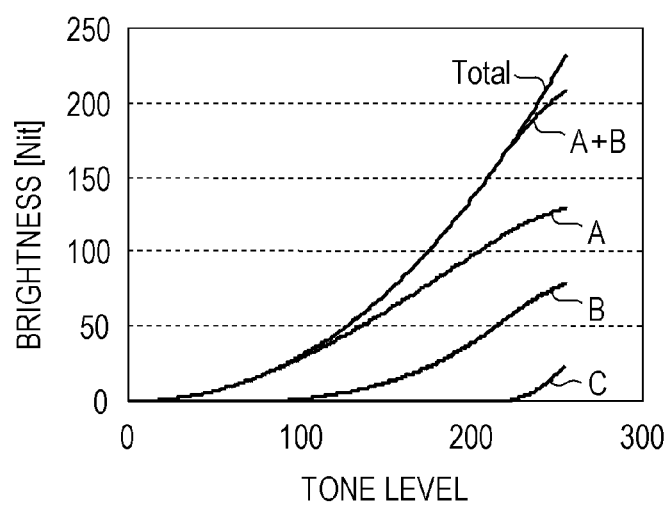
(c) 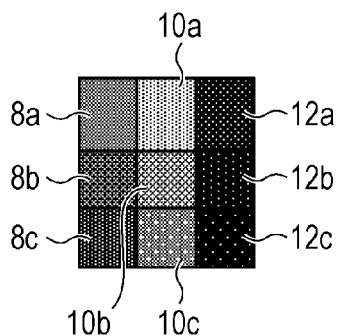

FIG. 6
(a) LUT2
| TONE LEVEL | DATA VOLTAGE [V] |
|---|---|
| 0 | 0.000 |
| 32 | 2.353 |
| 64 | 2.554 |
| 96 | 2.768 |
| 128 | 2.991 |
| 160 | 3.247 |
| 192 | 3.587 |
| 224 | 4.087 |
| 255 | 5.100 |
(b) 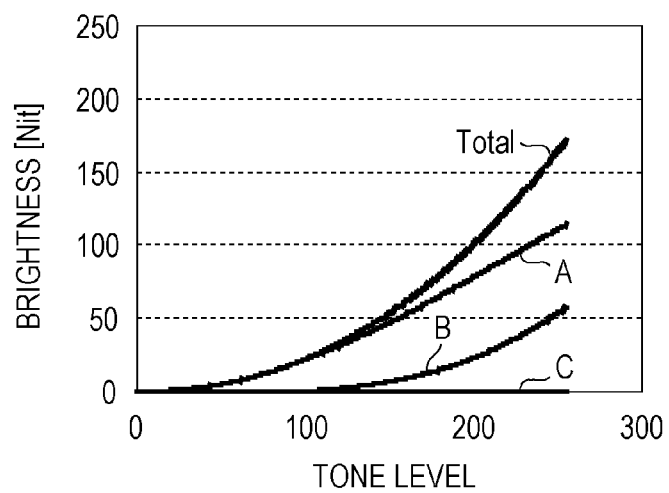
(c) 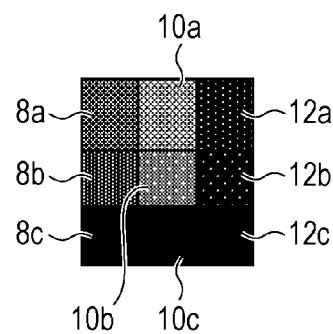

LIQUID CRYSTAL DISPLAY DEVICE, DRIVING METHOD, AND DISPLAY APPARATUS

TECHNICAL FIELD

The present invention relates to a liquid crystal display device that displays images by using liquid crystals. More particularly, the invention relates to a liquid crystal display device that may display images three-dimensionally by using a patterned retarder system. The invention also relates to a driving method for driving such a liquid crystal display device and a display apparatus including such a liquid crystal display device.

BACKGROUND ART

These days, a liquid crystal display device having a function of displaying images in a three-dimensional manner (hereinafter may also referred to as "displaying 3D (three-dimensional) pictures") in addition to a function of displaying images not in a three-dimensional manner (hereinafter may also referred to as "displaying 2D (two-dimensional) images" are in practical use.

As technologies for displaying three-dimensional pictures, an active shutter system, a naked-eye lenticular system, a patterned retarder system (polarization system, which is also called a PR system), and so on, are known. In any of the systems, a right-eye image is presented only to the right eye of a user, and a left-eye image is presented only to the left eye of the user, thereby enabling the user to view the images three-dimensionally.

In a liquid crystal display device using the active shutter system, right-eye frames (R frames) and left-eye frames (L frames) are alternately displayed. A user views images displayed on the liquid crystal display device with 3D glasses having a right-eye lens and a left-eye lens which perform a shutter operation in synchronization with the switching of the L frames and the R frames, thereby viewing the images three-dimensionally.

In a liquid crystal display device using the naked-eye lenticular system, a right-eye image and a left-eye image are respectively presented to the right eye and the left eye of a user via a lenticular lens formed on the front side of a liquid crystal panel. This enables the user to view the images three-dimensionally without the need to use 3D glasses.

In a liquid crystal display device using the patterned retarder system, a right-eye image is displayed by using pixels defined by odd-numbered horizontal scanning lines, while a left-eye image is displayed by using images defined by even-numbered horizontal scanning lines.

The patterned retarder system will be discussed more specifically below with reference to parts (a) and (b) of FIG. 11 and FIG. 12. Part (a) of FIG. 11 is an exploded perspective view illustrating a backlight unit 50, a liquid crystal panel 60, and a patterned retarder 70 included in a known liquid crystal display device using the patterned retarder system.

The backlight unit 50 supplies backlight to the liquid crystal panel 60 from the back side of the liquid crystal panel 60. On the liquid crystal panel 60, pixels defined by horizontal scanning lines (lateral-direction scanning lines) HL1 through HLN (N is the total number of horizontal scanning lines) and vertical scanning lines (longitudinal-direction scanning lines) VL1 through VLM (M is the total number of vertical scanning lines) are formed. The liquid crystal panel 60 controls the orientation of a liquid crystal included in each pixel, thereby making it possible to control the transmittance of backlight to be supplied to each pixel. Additionally, the liquid crystal panel 60 displays a right-eye image by using pixels defined by the odd-numbered horizontal scanning lines HL1, HL3, and so on, and displays a left-eye image by using pixels defined by the even-numbered horizontal scanning lines HL2, HL4, and so on.

The patterned retarder 70 is a retarder plate unit having a length in the direction of the horizontal scanning lines, and includes two types of retarder plates RR and RL having characteristics different from each other. The retarder plates RR convert linearly polarized light into right-handed circularly polarized light, while the retarder plates RL convert linearly polarized light into left-handed circularly polarized light. As shown in part (a) of FIG. 11, the retarder plates RR are disposed on the front side of the pixels defined by the odd-numbered horizontal scanning lines HL1, HL3, and so on, while the retarder plates RL are disposed on the front side of the pixels defined by the even-numbered horizontal scanning lines HL2, HL4, and so on.

Accordingly, a right-eye image to be displayed by using pixels defined by the odd-numbered horizontal scanning lines is represented by light which is right-handed circularly polarized after passing through the patterned retarder, while a left-eye image to be displayed by using pixels defined by the even-numbered horizontal scanning lines is represented by light which is left-handed circularly polarized after passing through the patterned retarder.

Part (b) of FIG. 11 shows 3D glasses 80 used in the patterned retarder system. As shown in part (b) of FIG. 11, the 3D glasses 80 include a right-eye lens and a left-eye lens. The right-eye lens transmits only right-handed circularly polarized light, while the left-eye lens transmits only left-handed circularly polarized light. Accordingly, by using the 3D glasses 80, among images displayed on a liquid crystal display device, the user is able to view right-eye images displayed by using pixels defined by the odd-numbered horizontal scanning lines only with the right eye, and views left-eye images displayed by using pixels defined by the even-numbered horizontal scanning lines only with the left eye, thereby making it possible to view the images three-dimensionally.

A liquid crystal display device using the patterned retarder system can also display 2D images by using both of pixels defined by the odd-numbered horizontal scanning lines and pixels defined by the even-numbered horizontal scanning lines. In this case, the user simply views images displayed on the liquid crystal display device without using the 3D glasses.

The 3D glasses 80 used in the patterned retarder system do not need electrical control, which is necessary for 3D glasses used in the active shutter system. Thus, the 3D glasses 80 can be implemented with a simple structure.

On the other hand, however, in the patterned retarder system, it is known that a phenomenon called crosstalk occurs mainly due to a limited thickness of a glass layer forming a liquid crystal panel.

The crosstalk is the following phenomenon occurring, for example, when the user views a liquid crystal panel from the obliquely top side or the obliquely bottom side. Part of a right-eye image to be displayed by using pixels defined by odd-numbered horizontal scanning lines passes through left-eye retarder plates disposed on the front side of pixels defined by even-numbered horizontal scanning lines and is then viewed, and part of a left-eye image to be displayed by using pixels defined by the even-numbered horizontal scanning lines passes through right-eye retarder plates disposed on the front side of pixels defined by the odd-numbered horizontal scanning lines and is then viewed. Accordingly, the right-eye image is mixed into the left-eye image represented by left-handed circularly polarized light, and the left-eye image is mixed into the right-eye image represented by right-handed circularly polarized light.

Hitherto, the configuration in which the occurrence of crosstalk is suppressed by forming black matrixes and black stripes along horizontal scanning lines in a liquid crystal panel and in a patterned retarder, respectively, is known.

FIG. 12 is a sectional view, along vertical scanning lines (longitudinal direction), of the backlight unit 50, the liquid crystal panel 60, and the patterned retarder 70 included in a known liquid crystal display device, and illustrates an area around pixels defined by an n-th horizontal scanning line and pixels defined by an (n+1)-th horizontal scanning line. FIG. 12 illustrates the liquid crystal panel 60 and the patterned retarder 70 configured in which the occurrence of crosstalk is suppressed by the use of black matrixes and black stripes.

As shown in FIG. 12, the backlight unit 50 is disposed at the back side (the left side in FIG. 12) of the liquid crystal panel 60, and the patterned retarder 70 is disposed at the front side (the right side in FIG. 12) of the liquid crystal panel 60. The liquid crystal panel 60 includes a first polarizing sheet 60a, a TFT-Glass 60b, a TFT substrate 60c, a color filter 60d, a CF-Glass 60e, and a second polarizing sheet 60f.

As shown in FIG. 12, in the TFT substrate 60c, a black matrix BM is formed between a pixel Pn defined by the n-th horizontal scanning line and a pixel Pn+1 defined by the (n+1)-th horizontal scanning line. Moreover, at the front side of the black matrixes BM, black matrixes BM' are formed within the color filter 60d, and black stripes BS are formed within the patterned retarder 70.

By using such black matrixes and black stripes, as shown in FIG. 12, if the angle between the direction of a normal to the liquid crystal panel 60 and a viewing direction is within α degrees in the direction of the vertical scanning lines, it is possible to suppress the occurrence of crosstalk.

With this configuration, however, the provision of black matrixes and black stripes decreases the aperture, thereby causing a problem that the brightness of images is reduced.

NPL 1 discloses a technology for suppressing the occurrence of crosstalk without using black stripes by dividing each pixel into two sub pixels (an upper sub pixel and a lower sub pixel) in the direction of vertical scanning lines. In this technology, when displaying a 2D image, a data voltage for displaying an image is supplied to both of the sub pixels, and when displaying a 3D image, a data voltage for displaying an image is supplied to only the upper sub pixel, while a data voltage for displaying black is supplied to the lower sub pixel. The lower sub pixel to which the data voltage for displaying black is supplied functions as a black matrix.

According to the technology disclosed in NPL 1, therefore, the brightness of images is not reduced when displaying a 2D image. When a 3D image is displayed, it is possible to suppress the occurrence of crosstalk by black matrixes.

CITATION LIST

Non Patent Literature

NPL 1: "A Nobel Polarizer Glasses-type 3D Displays with a Patterned Retarder", 2010 SID International Symposium, Washington State Convention Center, Seattle, Wash. USA, May 25, 2010

SUMMARY OF INVENTION

Technical Problem

However, in the technology disclosed in NPL 1, when displaying a 3D image, it is necessary to supply different data voltages to the upper sub pixel and the lower sub pixel. Thus, twice as many data lines (data bus lines and source bus lines) as those used in the configuration in which only 2D images are displayed are necessary, thereby causing a problem that the designing of a liquid crystal panel becomes complicated.

The present invention has been made in view of the above-described problem. It is an object of the present invention to realize a liquid crystal display device in which it is possible to suppress the occurrence of crosstalk without increasing the number of data bus lines.

Solution to Problem

In order to solve the above-described problem, the following liquid crystal display device is provided. A liquid crystal display device of the present invention is a liquid crystal display device that is capable of performing display in a first display mode and a second display mode. The liquid crystal display device includes: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. The liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel. The data voltage in the first display mode is set so that a maximum value of the transmittance of the liquid crystal layers of the sub pixels in the first display mode will be smaller than a maximum value of the transmittance of the liquid crystal layers of the sub pixels in the second display mode.

The liquid crystal display device of the present invention configured as described above is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel.

Accordingly, the number of data bus lines for applying a data voltage can be reduced to a smaller number than in a known configuration in which it is necessary to apply data voltages separately to the boundary-proximity sub pixel and sub pixels other than the boundary-proximity sub pixel. More specifically, if each pixel has two sub pixels, by using the liquid crystal display device of the present invention configured as described above, the number of data bus lines can be reduced by substantially half of that of the known configuration.

In the liquid crystal display device of the present invention configured as described above, the data voltage in the first display mode is set so that the maximum value of the transmittance of the liquid crystal layers of the sub pixels in the first display mode will be smaller than the maximum value of the transmittance of the liquid crystal layers of the sub pixels in the second display mode. Accordingly, the brightness presented by the boundary-proximity sub pixel in the first display mode is smaller than that in the second display mode.

Thus, in the first display mode, the occurrence of crosstalk caused by an image displayed by using boundary-proximity sub pixels when displaying an image which is viewable three-dimensionally using the patterned retarder system can be suppressed.

In the second display mode, as well as the first display mode, in each pixel, the brightness presented by the boundary-proximity sub pixel is smaller than that of pixels other than the boundary-proximity sub pixel, thereby improving viewing angle characteristics in the second display mode.

A driving method of the present invention is a driving method for driving a liquid crystal display device that is capable of performing display in a first display mode and a second display mode, the liquid crystal display device including: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. The liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel. The data voltage in the first display mode is set so that a maximum value of the transmittance of the liquid crystal layers of the sub pixels in the first display mode will be smaller than a maximum value of the transmittance of the liquid crystal layers of the sub pixels in the second display mode.

In the above-described driving method of the present invention, the liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel.

Accordingly, the number of data bus lines for applying a data voltage can be reduced to a smaller number than in a known configuration in which it is necessary to apply data voltages separately to the boundary-proximity sub pixel and sub pixels other than the boundary-proximity sub pixel. More specifically, if each pixel has two sub pixels, by using the liquid crystal display device driven by the above-described driving method, the number of data bus lines can be reduced by substantially half of that of the known configuration.

In the liquid crystal display device driven by the above-described driving method, the data voltage in the first display mode is set so that the maximum value of the transmittance of the liquid crystal layers of the sub pixels in the first display mode will be smaller than the maximum value of the transmittance of the liquid crystal layers of the sub pixels in the second display mode. Accordingly, the brightness presented by the boundary-proximity sub pixel in the first display mode is smaller than that in the second display mode.

Thus, in the first display mode, the occurrence of crosstalk caused by an image displayed by using boundary-proximity sub pixels when displaying an image which is viewable three-dimensionally using the patterned retarder system can be suppressed.

In the second display mode, as well as the first display mode, in each pixel, the brightness presented by the boundary-proximity sub pixel is smaller than that of pixels other than the boundary-proximity sub pixel, thereby improving viewing angle characteristics in the second display mode.

Advantageous Effects of Invention

As described above, a liquid crystal display device of the present invention is a liquid crystal display device that is capable of performing display in a first display mode and a second display mode. The liquid crystal display device includes: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. The liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel. The data voltage in the first display mode is set so that a maximum value of the transmittance of the liquid crystal layers of the sub pixels in the first display mode will be smaller than a maximum value of the transmittance of the liquid crystal layers of the sub pixels in the second display mode.

In the liquid crystal display device of the present invention configured as described above, compared with a known configuration in which data voltages are separately supplied to individual sub pixels, the occurrence of crosstalk can be effectively suppressed while reducing the number of data bus lines for applying data voltages.

BRIEF DESCRIPTION OF DRAWINGS

FIG. 5 shows diagrams illustrating an operation when the 2D display mode is selected in the liquid crystal display device of this embodiment: part (a) shows an example of a look-up table which is referred to by a control circuit when the 2D display mode is selected; part (b) is a graph indicating tone level-brightness characteristics concerning individual sub pixels in the 2D display mode; and part (c) schematically illustrates the brightness levels of individual sub pixels in the 2D display mode.

FIG. 6 shows diagrams illustrating an operation when the 3D display mode is selected in the liquid crystal display device of this embodiment: part (a) shows an example of a look-up table which is referred to by a control circuit when the 3D display mode is selected; part (b) is a graph indicating tone level-brightness characteristics concerning individual sub pixels in the 3D display mode; and part (c) schematically illustrates the brightness levels of individual sub pixels in the 3D display mode.

DESCRIPTION OF EMBODIMENTS

An embodiment of the present invention will be described below with reference to FIGS. 1 through 9. In the following description, a vertical alignment liquid crystal display device (VA (Vertical Alignment) liquid crystal display device) using a liquid crystal material exhibiting negative dielectric anisotropy is illustrated by way of example. However, the present invention is not restricted to this type of liquid crystal display device, and may be applicable to, for example, a TN (Twisted Nematic) type or an IPS (In-Plane Switching) type of liquid crystal display device. Additionally, in the following description, a normally black liquid crystal display device is illustrated by way of example, in which, as the absolute value of a voltage applied to a liquid crystal layer becomes greater, the transmittance of the liquid crystal layer increases. However, this embodiment is not restricted to this type of liquid crystal display device, and may be applicable to a normally white liquid crystal display device in which, as the absolute value of a voltage applied to a liquid crystal layer becomes greater, the transmittance of the liquid crystal layer decreases.

(Configuration of Liquid Crystal Display Device 1)

Figure 2:
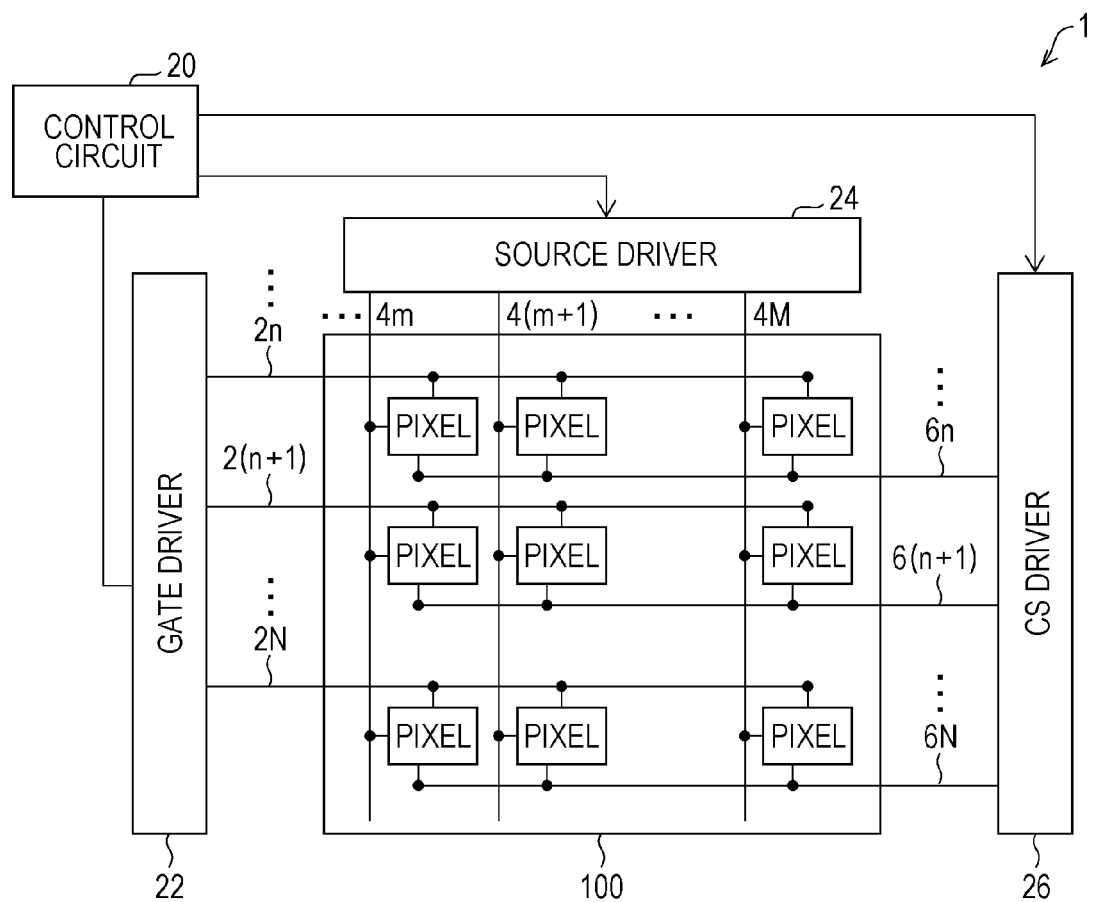
FIG. 2 illustrates the overall configuration of the liquid crystal display device according to this embodiment of the present invention.

A description will first be given, with reference to FIGS. 2 and 3, of the overall configuration of the liquid crystal display device 1 according to this embodiment. FIG. 2 illustrates the overall configuration of the liquid crystal display device 1 according to this embodiment. The liquid crystal display device 1 includes, as shown in FIG. 2, a control circuit 20, a gate driver 22, a source driver 24, a CS driver 26, and a liquid crystal panel 100.

The liquid crystal display device 1 is operated in one of a 2D display mode in which images cannot be displayed three-dimensionally and a 3D display mode in which images can be displayed three-dimensionally. In this case, a user may be able to select one of the two display modes. Alternatively, the liquid crystal display device 1 may automatically select one of the two display modes by referring to mode information associated with image data indicating an image to be displayed.

One of the 2D display mode and the 3D display mode may also be referred to as a "first display mode", and the other mode may also be referred to as a "second display mode".

As shown in FIG. 2, the liquid crystal display device 1 includes, on the liquid crystal panel 100, a plurality of gate bus lines 2, a plurality of source bus lines 4, a plurality of CS bus lines 6, and pixels defined by the associated gate bus lines and the associated source bus lines. In this embodiment, the total number of gate bus lines 2 is N (N is a positive integer), the total number of source bus lines is M, and the total number of CS bus lines 6 is N.

In FIG. 2, a gate bus line 2$n$ indicates the n-th gate bus line 2 (n is an integer which satisfies $1 \le n \le N$). A source bus line 4$m$ indicates the m-th source bus line 4 (m is an integer which satisfies $1 \le m \le M$). A CS bus line 6$n$ indicates the n-th CS bus line 6.

Hereinafter, pixels defined by the gate bus line 2$n$ may also be called pixels defined by the n-th horizontal scanning line HLn, and pixels defined by the source bus line 4$m$ may also be called pixels defined by the m-th vertical scanning line VLm.

(Driver)

As shown in FIG. 2, the gate driver 22 which supplies a gate signal to each of the gate bus lines 2, the source driver 24 which supplies a data signal to each of the source bus lines 4, and the CS driver 26 which supplies an auxiliary capacitor driving signal to each of the CS bus lines 6 are connected to the liquid crystal panel of the liquid crystal display device 1. These drivers are all operated on the basis of a control signal output from the control circuit 20.

The source bus line 4 refers to data voltage information supplied from the control circuit 20 and supplies a data voltage indicated by the data voltage information to each pixel. The data voltage information will be discussed later.

(Control Circuit)

The control circuit 20 calculates the tone value of each pixel from brightness information indicating the brightness of the associated picture element and from color difference information indicating the color difference of the associated picture element, the brightness information and the color difference information being included in image data indicating an image to be displayed. The picture element is a unit constituted by pixels which individually display a plurality of different colors. In this embodiment, one picture element is constituted by a pixel which displays red, a pixel which displays green, and a pixel which displays blue. This will be discussed later.

The control circuit 20 controls the timing of a gate signal supplied from the gate driver 22 and the timing of a data signal supplied from the source driver 24.

In a memory included in the control circuit 20, association information (also referred to as an "association table" or a "look-up table") indicating the association between tone values and data voltages is stored. By referring to the association information, the control circuit 20 converts a tone value of each pixel to data voltage information indicating a data voltage to be supplied to the pixel electrode of the associated pixel and supplies the data voltage information to the source bus line 4.

In this embodiment, a look-up table which is referred to by the control circuit 20 when the 2D display mode is selected and a look-up table which is referred to by the control circuit 20 when the 3D display mode is selected are different from each other. Specific examples of the look-up tables referred to in the individual display modes will be discussed later, and an explanation thereof will thus be omitted here.

(Configuration Around Liquid Crystal Panel 100)

Figure 3:
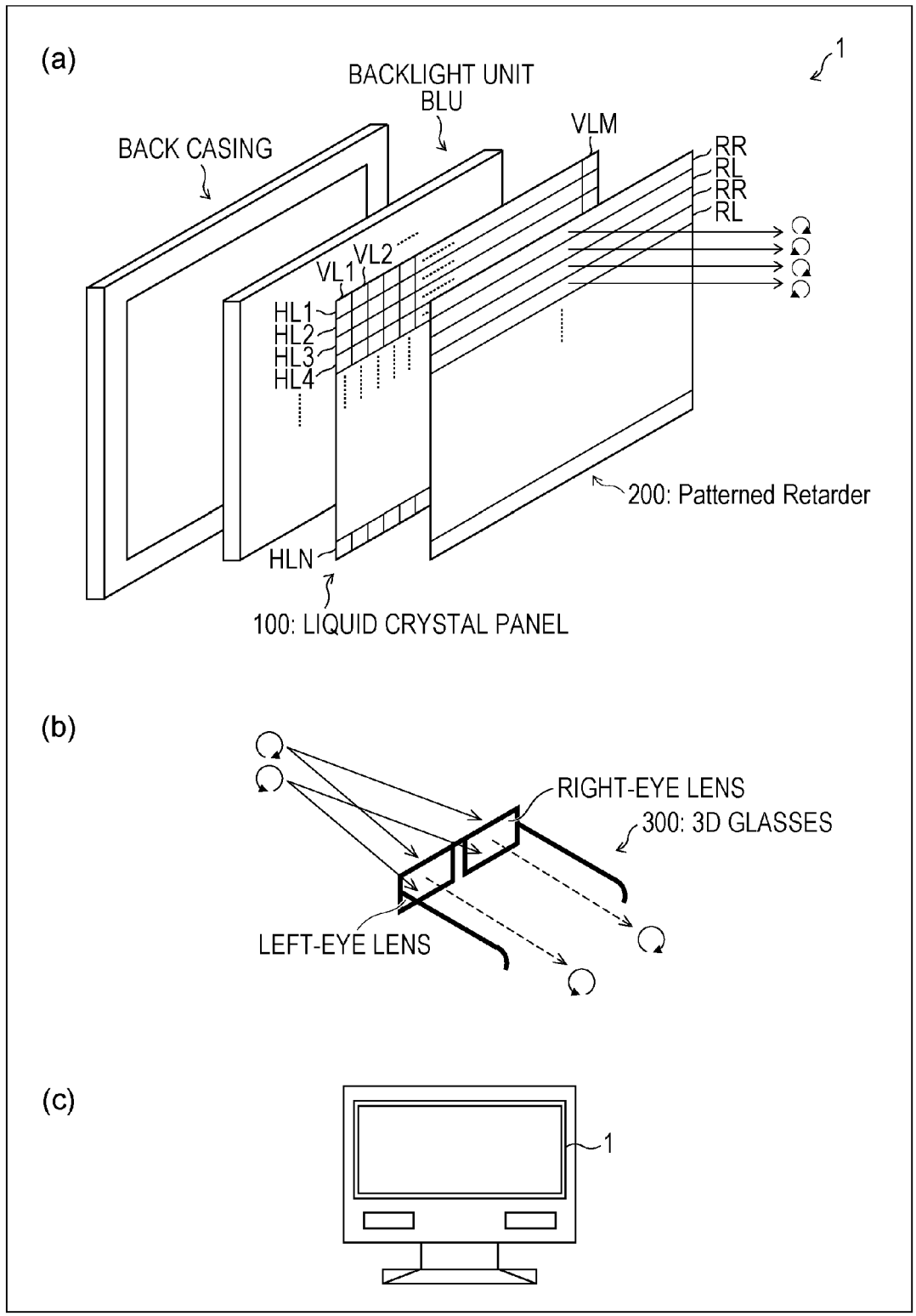
FIG. 3 illustrates the liquid crystal display device according to this embodiment of the present invention: part (a) is an exploded perspective view illustrating a configuration around a liquid crystal panel of the liquid crystal display device according to this embodiment; part (b) illustrates 3D glasses used together with the liquid crystal display device according to this embodiment; and part (c) illustrates the overall configuration of a liquid crystal color television receiver including the liquid crystal display device of this embodiment.

Part (a) of FIG. 3 is an exploded perspective view illustrating a configuration around the liquid crystal panel 100 of the liquid crystal display device 1. As shown in part (a) of FIG. 3, the liquid crystal display device 1 includes a backlight unit BLU at the back side of the liquid crystal panel 100 and a patterned retarder 200 at the front side of the liquid crystal panel 100. The backlight unit BLU, the liquid crystal panel 100, the control circuit 20 (not shown in part (a) of FIG. 3), the drivers (not shown in part (a) of FIG. 3), and the patterned retarder 200 are stored in a back casing. The front side of the patterned retarder 200 is covered with a transparent protective panel (not shown). Hereinafter, a combination of the liquid crystal panel 100 and the patterned retarder 200 may be called a display panel.

The backlight unit BLU supplies backlight to the liquid crystal panel 100 from the back side of the liquid crystal panel 100. The backlight unit BLU may be configured such that a plurality of LEDs (Light Emitting Diodes) which emit white light are disposed substantially uniformly on the back side of the liquid crystal panel 100 (direct-lighting LED configuration). In this case, the backlight unit BLU includes a diffuser, and light which emits from the above-described plurality of LEDs is formed into uniform backlight by using the diffuser and is then applied to the back side of the liquid crystal panel 100. With this configuration, the irregularity of the brightness of the backlight can be reduced, and also, the efficiency in using light can be increased, and thus, power consumption can be reduced.

The backlight unit BLU may be configured such that a backlighting light source, such as LEDs or a fluorescent tube, is disposed near an edge of the liquid crystal panel 100 (edge-lighting configuration). In this case, the backlight unit BLU further includes a waveguide and a reflector on the back side of the diffuser, and after light emitting from the light source is formed into uniform backlight by using the waveguide and the reflector, it is applied to the back side of the liquid crystal panel 100.

The patterned retarder 200 is a retarder plate unit having a length in the direction of the gate bus lines, and includes two types of retarder plates RR and RL having characteristics different from each other. The retarder plates RR convert linearly polarized light into right-handed circularly polarized light, while the retarder plates RL convert linearly polarized light into left-handed circularly polarized light. As shown in part (a) of FIG. 3, the retarder plates RR are disposed on the front side of pixels defined by the odd-numbered horizontal scanning lines HL1, HL3, and so on, while the retarder plates RL are disposed on the front side of pixels defined by the even-numbered horizontal scanning lines HL2, HL4, and so on.

Accordingly, an image to be displayed by pixels defined by the odd-numbered gate bus lines is represented by light which is right-handed circularly polarized after passing through the patterned retarder 200, while an image to be displayed by pixels defined by the even-numbered gate bus lines is represented by light which is left-handed circularly polarized after passing through the patterned retarder 200.

The retarder plates RR and RL may be constituted by, for example, $\lambda/4$ wave plates having optical axes different from each other.

It can also be said that, more generally, the retarder plates RR and RL are optical plates which generate outgoing light beams having polarization states different from each other from incident light.

One of the two types of retarder plates RR and RL may also be referred to as a "first optical plate" and the other type may also be referred to as a "second optical plate". Light converted by using the first optical plate may also be referred to as "outgoing light having a first polarization state" and light converted by using the second optical plate may also be referred to as "outgoing light having a second polarization state".

Part (b) of FIG. 3 shows 3D glasses 300 used in this embodiment. As shown in part (b) of FIG. 3, the 3D glasses 300 include a right-eye lens and a left-eye lens.

The right-eye lens transmits only right-handed circularly polarized light, while the left-eye lens transmits only left-handed circularly polarized light. Accordingly, by using the 3D glasses 300, among images displayed on the liquid crystal display device 1, the user is able to view right-eye images displayed by using pixels defined by the odd-numbered gate bus lines only with the right eye, and view left-eye images displayed by using pixels defined by the even-numbered gate bus lines only with the left eye.

Accordingly, by using the pixels defined by the odd-numbered gate bus lines and the pixels defined by the even-numbered gate bus lines, a right-eye image and a left-eye image which have viewpoints different from each other are displayed, thereby enabling the user to view the images three-dimensionally.

The liquid crystal display device 1 can also display 2D images by using both of the pixels defined by the odd-numbered gate bus lines and the pixels defined by the even-numbered gate bus lines. In this case, the user simply views images displayed on the liquid crystal display device 1 without using the 3D glasses 300.

The 3D glasses 300 used in this embodiment do not need electrical control, which is necessary for 3D glasses used in the active shutter system. Thus, the 3D glasses 300 can be implemented with a simple structure.

Part (c) of FIG. 3 illustrates the overall configuration of a liquid crystal color television receiver including the liquid crystal display device 1 of this embodiment. The liquid crystal display device 1 is mounted on a display section of the liquid crystal color television receiver. The liquid crystal display device 1 of this embodiment may be used for a notebook personal computer, various types of displays, a cellular telephone terminal, and a personal digital assistant, as well as a liquid crystal color television receiver.

(Pixel Structure)

Figure 1:
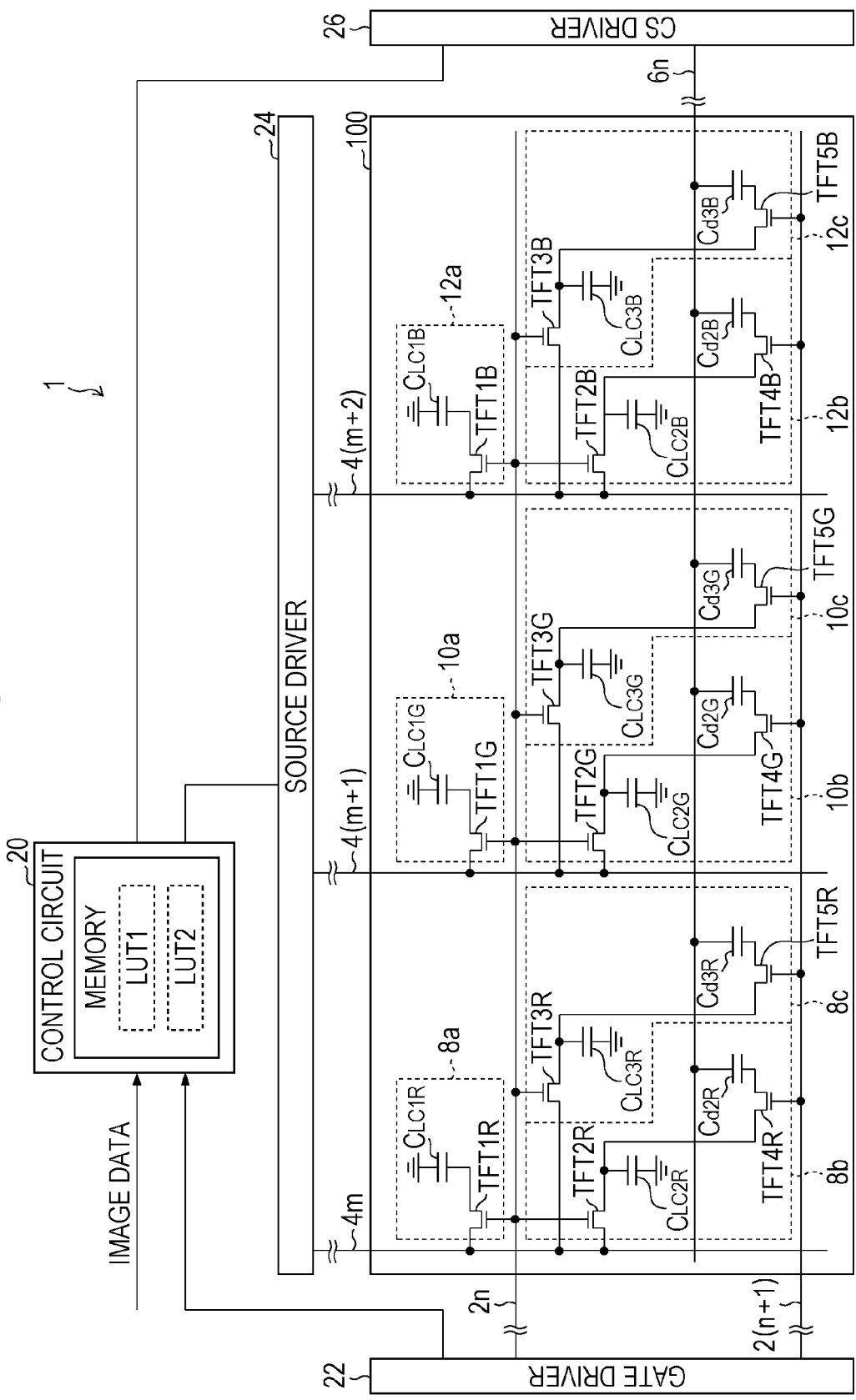
FIG. 1 illustrates, together with drivers and a control circuit, an equivalent circuit of a liquid crystal panel of a liquid crystal display device according to an embodiment of the present invention.

FIG. 1 illustrates, together with the drivers and the control circuit 20, an equivalent circuit of pixels having a multi-pixel structure forming one picture element on the liquid crystal panel 100 of the liquid crystal display device 1 according to this embodiment. In the memory included in the control circuit 20, a look-up table LUT1 used for the 2D display mode and a look-up table LUT2 used for the 3D display mode are stored. The control circuit 20 refers to one of the look-up tables and controls the source driver 24.

As shown in FIG. 1, a plurality of pixels are formed on the liquid crystal panel 100 of the liquid crystal display device 1, and the liquid crystal display device 1 drives individual pixels by using a driving method, such as a 3TFT driving method. The pixels each include a liquid crystal layer and an electrode which applies a voltage to the liquid crystal layer, and are arranged in a matrix form having rows and columns. The picture element is a unit constituted by pixels which individually display a plurality of different colors. In this embodiment, one picture element is constituted by an R pixel 8 which displays red, a G pixel 10 which displays green, and a B pixel which displays blue.

As shown in FIG. 1, the liquid crystal panel 100 of the liquid crystal display device 1 includes a plurality of gate bus lines 2, a plurality of source bus lines 4, a plurality of CS bus lines 6 (may be referred to as "auxiliary capacitor lines" or "storage capacitor bus lines"), a plurality of switching elements TFT1 through TFT5, a plurality of liquid crystal capacitors Clc1 through Clc3, and a plurality of capacitors (storage capacitors) Cd1 through Cd3.

The plurality of gate bus lines 2 and the plurality of source bus lines 4 are formed such that they intersect with each other via an insulating film (not shown). In the liquid crystal display device 1, one of the R pixel 8 which displays red, the G pixel 10 which displays green, and the B pixel 12 which displays blue is formed in a region defined by one gate bus line 2 and one source bus line 4. The R pixel 8, the G pixel 10, and the B pixel 12 are formed adjacent to each other along the gate bus line 2. By using a combination of these pixels, a desired color image can be displayed.

A description will be given below of an example in which the liquid crystal display device 1 includes R pixels, G pixels, and B pixels. However, this embodiment is not restricted to such a configuration. For example, the liquid crystal display device 1 may include one or both of Ye pixels which display yellow and W pixels which display white, in addition to R pixels, G pixels, and B pixels. In this case, too, advantages described below will also be achieved.

(Bright Pixels, Dark Pixels, and Intermediate Pixels)

Each of the R pixel 8, the G pixel 10, and the B pixel 12 has three sub pixels (a bright pixel, a dark pixel, and an intermediate pixel) which can apply different voltages to the liquid crystal layers. As shown in FIG. 1, the R pixel 8 includes a bright pixel 8a, an intermediate pixel 8b, and a dark pixel 8c, the G pixel 10 includes a bright pixel 10a, an intermediate pixel 10b, and a dark pixel 10c, and the B pixel 12 includes a bright pixel 12a, an intermediate pixel 12b, and a dark pixel 12c. Each of the intermediate pixels and the dark pixels includes a storage capacitor, one end of which is connected to the CS bus line 6.

In this embodiment, the pixels forming each picture element are arranged in the order of the R pixel 8, the G pixel 10, and the B pixel 12 along a gate bus line 2. The bright pixels are arranged on a first straight line parallel with a gate bus line 2, the intermediate pixels are arranged on a second straight line parallel with a gate bus line 2, and the dark pixels are arranged on a third straight line parallel with a gate bus line 2.

The dark pixel 8c of the R pixel 8 defined by the gate bus line 2n and the bright pixel 8a of the R pixel 8 defined by the gate bus line 2(n+1) are adjacent to each other with a boundary which is parallel with a gate bus line 2 therebetween. The G pixel 10 and the B pixel 12 are also arranged in a similar manner.

The dark pixel 8c of the R pixel 8 and the dark pixel 10c of the G pixel 10 are adjacent to each other with a boundary which is parallel with a source bus line 4 therebetween, and the dark pixel 10c of the G pixel 10 and the dark pixel 12c of the B pixel 12 are adjacent to each other with a boundary which is parallel with a source bus line 4 therebetween. The bright pixels and the intermediate pixels are also arranged in a similar manner.

(Liquid Crystal Capacitor)

The sub pixels of each pixel include liquid crystal capacitors. The bright pixels include liquid crystal capacitors Clc1, the intermediate pixels include liquid crystal capacitors Clc2, and the dark pixels include liquid crystal capacitors Clc3. More specifically, as shown in FIG. 1, the bright pixel 8a of the R pixel 8 includes Clc1R, the intermediate pixel 8b of the R pixel 8 includes Clc2R, and the dark pixel 8c of the R pixel 8 includes Clc3R. Similarly, the bright pixel 10a of the G pixel 10 includes Clc1G, the intermediate pixel 10b of the G pixel 10 includes Clc2G, and the dark pixel 10c of the G pixel 10 includes Clc3G. Similarly, the bright pixel 12a of the B pixel 12 includes Clc1B, the intermediate pixel 12b of the R pixel 12 includes Clc2B, and the dark pixel 12c of the R pixel 12 includes Clc3B.

Each of the liquid crystal capacitors is constituted by a sub pixel electrode, a liquid crystal layer, and a common electrode which opposes the sub pixel electrode with the liquid crystal layer therebetween.

(Storage Capacitor)

Each of the intermediate pixels and each of the dark pixels include storage capacitors Cd. More specifically, as shown in FIG. 1, the intermediate pixel 8b of the R pixel 8 includes a storage capacitor Cd2R, and the dark pixel 8c of the R pixel 8 includes a storage capacitor Cd3R. The intermediate pixel 10b of the G pixel 10 includes a storage capacitor Cd2G, and the dark pixel 10c of the G pixel 10 includes a storage capacitor Cd3G. The intermediate pixel 12b of the B pixel 12 includes a storage capacitor Cd2B, and the dark pixel 12c of the B pixel 12 includes a storage capacitor Cd3B.

Each of the storage capacitors Cd2 is formed by a storage capacitor electrode connected to the source electrode of the corresponding TFT4, an insulating film, and a storage capacitor common electrode which opposes the storage capacitor electrode with the insulating film therebetween. Each of the storage capacitors Cd3 is formed by a storage capacitor electrode connected to the source electrode of the corresponding TFT5, an insulating film, and a storage capacitor common electrode which opposes the storage capacitor electrode with the insulating film therebetween. The storage capacitor common electrodes are connected to the CS bus line 6n.

(Switching Elements TFT1 through TFT3)

A TFT1 (thin-film transistor 1), a TFT2, and a TFT3 are formed in each of the R pixel 8, the G pixel 10, and the B pixel 12. Gate electrodes of the TFT1 through TFT3 are connected to the same gate bus line 2n, and source electrodes of the TFT1 through TFT3 are connected to the same source bus line 4. That is, as shown in FIG. 1, the source electrodes of the TFT1R, TFT2R, and TFT3R of the R pixel 8 are connected to the source bus line 4m. Similarly, the source electrodes of the TFT1G, TFT2G, and TFT3G of the G pixel 10 are connected to the source bus line 4 (m+1), and the source electrodes of the TFT1B, TFT2B, and TFT3B of the B pixel 12 are connected to the source bus line 4(m+2). The drain electrodes of the TFT1, TFT2, and TFT3 are connected to the corresponding sub pixel electrodes.

The TFT1 through the TFT3, and a TFT4 and a TFT5, which will be discussed below, enter a conducting state (ON state) when a high-level gate signal is applied to the gate electrodes of the TFT1 through the TFT5, and they enter a non-conducting state (OFF state, disconnection state) when a low-level gate signal is applied to the gate electrodes of the TFT1 through the TFT5.

(Switching Elements TFT4 and TFT5)

A TFT4 is formed in the intermediate pixel of each of the R pixel 8, the G pixel 10, and the B pixel 12, and the TFT5 is formed in the dark pixel of each of the R pixel 8, the G pixel 10, and the B pixel 12. More specifically, a TFT4R is formed in the intermediate pixel 8b of the R pixel 8 and a TFT5R is formed in the dark pixel 8c of the R pixel 8. A TFT4G is formed in the intermediate pixel 10b of the G pixel 10 and a TFT5G is formed in the dark pixel 10c of the G pixel 10. A TFT4B is formed in the intermediate pixel 12b of the B pixel 12 and a TFT5B is formed in the dark pixel 12c of the B pixel 12.

The gate electrodes of the TFT4 and the TFT5 are electrically connected to the gate bus line subsequent to the gate bus line which defines the pixel in which the TFT4 and TFT5 are formed, that is, they are electrically connected to the gate bus line 2(n+1). The drain electrode of each TFT4 is electrically connected via a contact hole to the sub pixel electrode of an associated one of the intermediate pixels 8b, 10b, and 12b. The source electrode of each TFT4 is connected to the storage capacitor electrode of an associated storage capacitor Cd. More specifically, the source electrode of the TFT4R is connected to the storage capacitor electrode of the storage capacitor Cd2R, the source electrode of the TFT4G is connected to the storage capacitor electrode of the storage capacitor Cd2G, and the source electrode of the TFT4B is connected to the storage capacitor electrode of the storage capacitor Cd2B.

Similarly, the drain electrode of each TFT5 is electrically connected via a contact hole to the sub pixel electrode of an associated one of the dark pixels 8c, 10c, and 12c. The source electrode of each TFT5 is connected to the storage capacitor electrode of the associated storage capacitor Cd. More specifically, the source electrode of the TFT5R is connected to the storage capacitor electrode of the storage capacitor Cd3R, the source electrode of the TFT5G is connected to the storage capacitor electrode of the storage capacitor Cd3G, and the source electrode of the TFT5B is connected to the storage capacitor electrode of the storage capacitor Cd3B.

In the liquid crystal display device 1 of this embodiment, the gate bus line 2n is selected and electric charge is stored in the liquid crystal capacitors Clc1 of the bright pixels, in the liquid crystal capacitors Clc2 of the intermediate pixels, in the liquid crystal capacitors Clc3 of the dark pixels. Then, after the lapse of a certain time, the gate bus line 2(n+1) is selected so as to turn ON the TFT4 and the TFT5. Accordingly, electric charge is re-distributed, and a voltage difference is generated among the sub pixel electrode of a bright pixel, the sub pixel electrode of an intermediate pixel, and the sub pixel electrode of a dark pixel. In this embodiment, the capacitances of the storage capacitors Cd are set so that the bright pixel presents a higher level of brightness than the intermediate pixel and the dark pixel and so that the intermediate pixel presents a higher level of brightness than the dark pixel.

A description has been given above, such that the gate electrodes of the TFT4 and the TFT5 are connected to the gate bus line 2(n+1) subsequent to the gate bus line 2n which defines the image. However, this embodiment is not restricted to this configuration, and, generally, the gate electrodes of the TFT4 and the TFT5 may be connected to the gate bus line 2(n+p) (p is an integer which satisfies 1≤p<n) subsequent to the gate bus line 2n which defines the pixel.

(CS Bus Line 6)

The CS bus line 6 extends in parallel with the gate bus line 2 such that it crosses a pixel region defined by the gate bus line 2 and the source bus line 4. Each CS bus line 6 is formed for all of the R pixel 8, the G pixel 10, and the B pixel 12 formed in the same row in the liquid crystal display device 1. The CS bus line 6n is connected to the storage capacitor common electrodes.

(Basic Operation of Liquid Crystal Display Device 1)

A basic driving method for the liquid crystal panel 100 of the liquid crystal display device 1 will be described below with reference to parts (a) through (f) of FIG. 4. A description will first be given of the driving of the R pixel 8, followed by a description of the driving of the G pixel 10 and the B pixel 12.

Generally, the value of a liquid crystal capacitor and the value of a storage capacitor are dependent on voltages applied to the liquid crystal capacitor and the storage capacitor. However, since such a dependency is not a substantial factor in this embodiment, it will be ignored in the following description. Nevertheless, this assumption does not restrict this embodiment, and this embodiment may also be applicable even when there is such a dependency.

A description will also be given below, for a simple representation, of an example in which the potential of the CS bus line 6 is 0. However, this embodiment is not restricted to this configuration, and, for example, a voltage signal having a square wave may be supplied to the CS bus line 6.

A description will also be given below, for a simple representation, assuming that the electric charge stored in the storage capacitor Cd is 0 at a time immediately before the TFT4 and the TFT5 enter the conducting state. However, this does not restrict this embodiment, and more generally, a case in which the electric charge stored in the storage capacitor Cd is not 0 at a time immediately before the TFT4 and the TFT5 enter the conducting state may be equally considered.

Moreover, a description will be given below, for a simple representation, of a case in which a positive voltage is supplied to individual sub pixel electrodes from a source bus line. However, a case in which a negative voltage is supplied to individual sub pixel electrodes from a source bus line may be equally considered.

Figure 4:
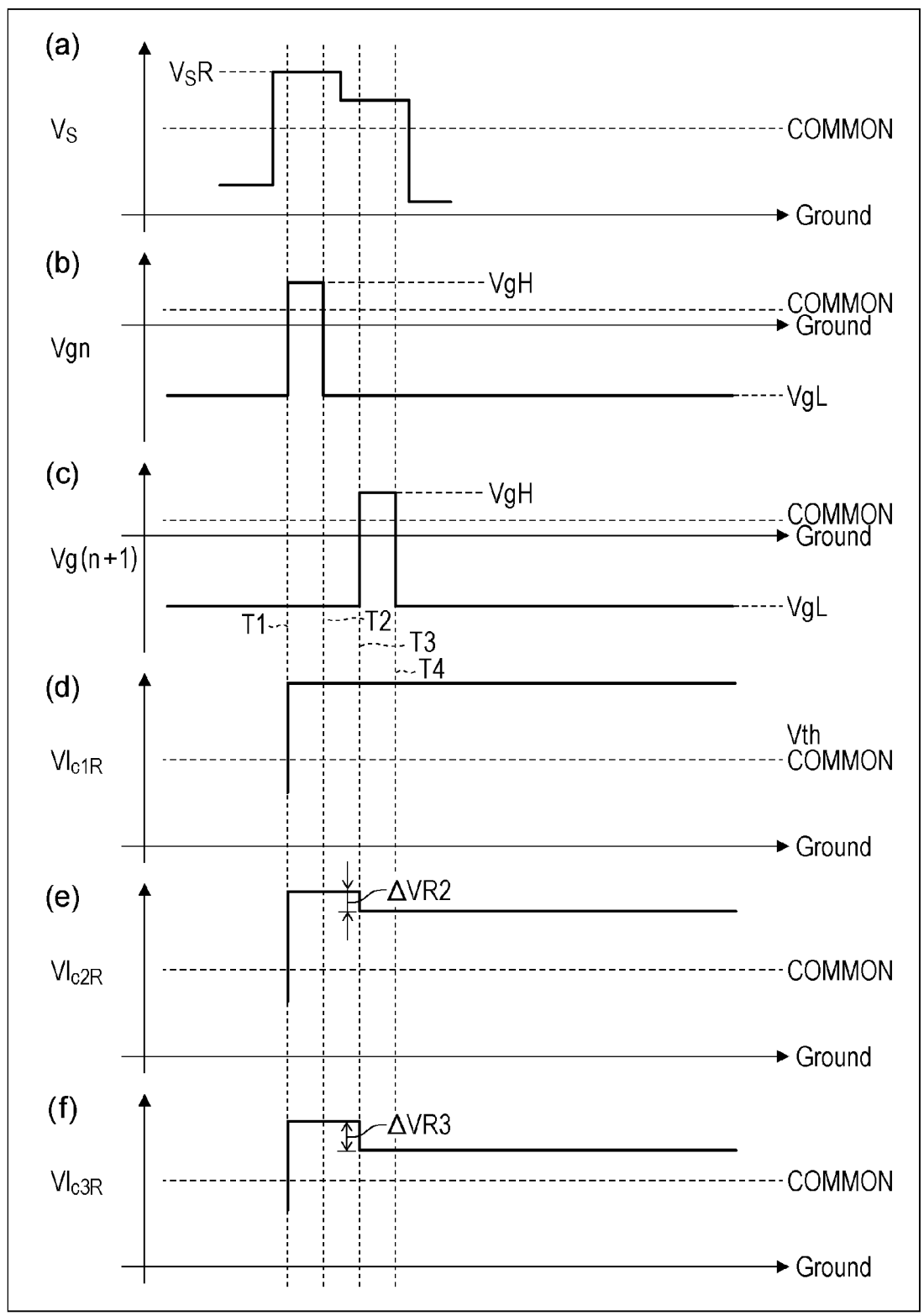
FIG. 4 is a timing chart schematically illustrating waveforms and timings of voltages when the liquid crystal display device according to this embodiment of the present invention is driven: part (a) shows a voltage waveform of a data signal supplied from a source driver to a source bus line; part (b) shows a voltage waveform of a gate signal supplied from a gate driver to the n-th gate bus line; part (c) shows a voltage waveform of a gate signal supplied from the gate driver to the (n+1)-th gate bus line; part (d) shows a voltage waveform of a sub pixel electrode of a bright pixel disposed in a pixel which displays red; part (e) shows a voltage waveform of a sub pixel electrode of an intermediate pixel disposed in a pixel which displays red; and part (f) shows a voltage waveform of a sub pixel electrode of a dark pixel disposed in a pixel which displays red.

Parts (a) through (f) of FIG. 4 are timing charts schematically illustrating waveforms and timings of voltages when the liquid crystal display device 1 is driven.

Part (a) of FIG. 4 shows a voltage waveform Vs of a data signal supplied from the source driver 24 to the source bus line 4. Part (b) of FIG. 4 shows a voltage waveform Vgn of a gate signal supplied from the gate driver 22 to the gate bus line 2n. Part (c) of FIG. 4 shows a voltage waveform Vg(n+1) of a gate signal supplied from the gate driver 22 to the gate bus line 2(n+1). Part (d) of FIG. 4 shows a voltage waveform Vlc1R of the sub pixel electrode of the bright pixel 8a disposed in the R pixel 8. Part (e) of FIG. 4 shows a voltage waveform Vlc2R of the sub pixel electrode of the intermediate pixel 8b disposed in the R pixel 8. Part (f) of FIG. 4 shows a voltage waveform Vlc3R of the sub pixel electrode of the dark pixel 8c disposed in the R pixel 8. The broken lines in FIG. 4 indicate a voltage waveform COMMON (Vcom) of the common electrodes.

(Driving of R Pixel 8)

At time T1, the voltage Vgn of a gate signal is changed from VgL (low) to VgH (high), thereby causing the TFT1R, TFT2R, and TFT3R to be simultaneously in the conducting state (ON state). Then, the voltage of a data signal is applied to the sub pixel electrode of the bright pixel 8a, that of the intermediate pixel 8b, and that of the dark pixel 8c via the source bus line 4, and the voltage Vlc1R of the sub pixel electrode of the bright pixel 8a, the voltage Vlc2R of the sub pixel electrode of the intermediate pixel 8b, and the voltage Vlc3R of the sub pixel electrode of the dark pixel 8c are changed to the voltage VsR of the data signal at time T1. Vlc1R, Vlc2R, and Vlc3R are expressed by equations (1a), (1b), and (1c), respectively.

$$Vlc1R = VsR \quad (1a)$$

$$Vlc2R = VsR \quad (1b)$$

$$Vlc3R = VsR \quad (1c)$$

The voltage VsR of the data signal transmitted via the source bus line 4 is a display voltage indicating a tone level to be displayed in the pixel, and is written into the corresponding pixel while the TFTs are in the ON state (a period in this state may also be called a "selection period").

Subsequently, at time T2, the voltage Vgn of the gate signal is changed from VgH to VgL, thereby causing the TFT1R, TFT2R, and TFT3R to be simultaneously in the non-conducting state (OFF state). Accordingly, the sub pixel electrode of the bright pixel 8a, that of the intermediate pixel 8b, and that of the dark pixel 8c are all electrically insulated from the source bus line 4 (a period in this state may also be called a "non-selection period").

Generally, immediately after the TFT1R, TFT2R, and TFT3R are switched from the ON state to the OFF state, due to a dropping phenomenon (also called a field-through phenomenon) caused by the influence of a parasitic capacitance, etc. of the TFT1R, TFT2R, and TFT3R, the voltages Vlc1R, Vlc2R, and Vlc3R of the sub pixel electrodes are dropped by amounts of $\Delta$Vd1R, $\Delta$Vd2R, and $\Delta$Vd3R, respectively. $\Delta$Vd1R, $\Delta$Vd2R, and $\Delta$Vd3R are expressed by equations (2a), (2b), and (2c), respectively.

$$Vlc1R = VsR - \Delta Vd1R \quad (2a)$$

$$Vlc2R = VsR - \Delta Vd2R \quad (2b)$$

$$Vlc3R = VsR - \Delta Vd3R \quad (2c)$$

However, in the following description, the contribution of voltage drops $\Delta$Vd1R, $\Delta$Vd2R, and $\Delta$Vd3R due to such a field-through phenomenon will be ignored.

Subsequently, at time T3, the voltage Vg(n+1) of the gate signal is changed from VgL to VgH at time T3, thereby causing the TFT4R and the TFT5R in the conducting state. Then, the sub pixel electrode of the intermediate pixel 8b is connected to the storage capacitor electrode of the storage capacitor Cd2R, and the sub pixel electrode of the dark pixel 8c is connected to the storage capacitor electrode of the storage capacitor Cd3R.

As a result, the voltage Vlc2R of the sub pixel electrode of the intermediate pixel 8b and the voltage Vlc3R of the sub pixel electrode of the dark pixel 8c are changed to values expressed by equations (3a) and (3b), respectively:

$$Vlc2R = VsR - \Delta VR2 \quad (3a)$$

$$Vlc3R = VsR - \Delta VR3 \quad (3b)$$

where $\Delta$VR2 and $\Delta$VR3 are expressed by equations (4a) and (4b), respectively.

$$\Delta VR2 = VsR \times Cd2R/(Clc2R + Cd2R) \quad (4a)$$

$$\Delta VR3 = VsR \times Cd3R/(Clc3R + Cd3R) \quad (4b)$$

In this embodiment, it is assumed that Clc2R, Clc3R, Cd2R, and Cd3R are set such that expression (5) holds true.

$$\Delta VR2 < \Delta VR3 \quad (5)$$

The voltage Vlc1R of the sub pixel electrode of the bright pixel 8a is not changed at time T3.

Subsequently, at time T4, the voltage Vg(n+1) of the gate signal is changed from VgH to VgL, thereby causing the TFT4R and the TFT5R to be in the non-conducting state. Then, the sub pixel electrode of the intermediate pixel 8b is insulated from the storage capacitor electrode of the storage capacitor Cd2R, and the sub pixel electrode of the dark pixel 8c is insulated from the storage capacitor electrode of the storage capacitor Cd3R.

After the above-described process, effective voltages V1R, V2R, and V3R applied to the liquid crystal layers of the bright pixel 8a, the intermediate pixel 8b, and the dark pixel 8c, respectively, are expressed by equations (6a), (6b) and (6c), respectively.

$$V1R = VsR - Vcom \tag{6a}$$

$$V2R = VsR - \Delta VR2 - Vcom \tag{6b}$$

$$V3R = VsR - \Delta VR3 - Vcom \tag{6c}$$

As stated above, in this embodiment, it is assumed that ΔVR2<ΔVR3 holds true and that V1R, V2R, and V3R satisfy VR3<VR2<VR1. Accordingly, after the above-described process, the transmittance of the liquid crystal layer of the bright pixel 8a is higher than that of the intermediate pixel 8b and that of the dark pixel 8c, and the transmittance of the liquid crystal layer of the intermediate pixel 8b is higher than that of the dark pixel 8c. Thus, the bright pixel 8a presents a higher level of brightness than the intermediate pixel 8b and the dark pixel 8c, and the intermediate pixel 8b presents a higher level of brightness than the dark pixel 8c.

The difference ΔVR12 (=V1R−V2R) in the effective voltage applied to the liquid crystal layer of the bright pixel 8a and that of the intermediate pixel 8b disposed in the R pixel is expressed by equation (7a).

$$\Delta V12R = \Delta VR2 \tag{7a}$$

The difference ΔVR13 (=V1R−V3R) in the effective voltage applied to the liquid crystal layer of the bright pixel 8a and that of the dark pixel 8c disposed in the R pixel is expressed by equation (7b).

$$\Delta V13R = \Delta VR3 \tag{7b}$$

The difference ΔVR23 (=V2R−V3R) in the effective voltage applied to the liquid crystal layer of the intermediate pixel 8b and that of the dark pixel 8c disposed in the R pixel is expressed by equation (7c).

$$\Delta V23R = \Delta VR3 - \Delta VR2 \tag{7c}$$

In this manner, the effective voltages applied to the liquid crystal layers of the sub pixels are different from each other, thereby achieving the effect of enhancing viewing angle characteristics, which will be discussed later.

(Driving of G Pixel 10)

The G pixel 10 is driven in a similar manner. Effective voltages V1G, V2G, and V3G applied to the liquid crystal layers of the bright pixel 10a, the intermediate pixel 10b, and the dark pixel 10c, respectively, are expressed by equations (8a), (8b) and (8c), respectively:

$$V1G = VsG - Vcom \tag{8a}$$

$$V2G = VsG - \Delta VG2 - Vcom \tag{8b}$$

$$V3G = VsG - \Delta VG3 - Vcom \tag{8c}$$

where VsG is a voltage of a data signal supplied to the sub pixel electrodes of the G pixel 10 at a time at which the TFT1G through the TFT3G are changed to the conducting state, and where ΔVG2 and ΔVG3 are expressed by equations (9a) and (9b), respectively.

$$\Delta VG2 = VsG \times Cd2G/(Clc2G + Cd2G) \tag{9a}$$

$$\Delta VG3 = VsG \times Cd3G/(Clc3G + Cd3G) \tag{9b}$$

As in the R pixel 8, in this embodiment, it is assumed that ΔVG2<ΔVG3 holds true and that V1G, V2G, and V3G satisfy VG3<VG2<VG1. Accordingly, the transmittance of the liquid crystal layer of the bright pixel 10a is higher than that of the intermediate pixel 10b and that the dark pixel 10c, and the transmittance of the liquid crystal layer of the intermediate pixel 10b is higher than that of the dark pixel 10c. Thus, the bright pixel 10a presents a higher level of brightness than the intermediate pixel 10b and the dark pixel 10c, and the intermediate pixel 10b presents a higher level of brightness than the dark pixel 10c.

The difference ΔV12G (=V1G−V2G) in the effective voltage applied to the liquid crystal layer of the bright pixel 10a and that of the intermediate pixel 10b disposed in the G pixel is expressed by equation (10a).

$$\Delta V12G = \Delta VG2 \tag{10a}$$

The difference ΔV13G (=V1G−V3G) in the effective voltage applied to the liquid crystal layer of the bright pixel 10a and that of the dark pixel 10c disposed in the G pixel is expressed by equation (10b).

$$\Delta V13G = \Delta VG3 \tag{10b}$$

The difference ΔV23G (=V2G−V3G) in the effective voltage applied to the liquid crystal layer of the intermediate pixel 10b and that of the dark pixel 10c disposed in the G pixel is expressed by equation (10c).

$$\Delta V23G = \Delta VG3 - \Delta VG2 \tag{10c}$$

(Driving of B Pixel 12)

The B pixel 12 is driven in a similar manner. Effective voltages V1B, V2B, and V3B applied to the liquid crystal layers of the bright pixel 12a, the intermediate pixel 12b, and the dark pixel 12c, respectively, are expressed by equations (11a), (11b) and (11c), respectively:

$$V1B = VsB - Vcom \tag{11a}$$

$$V2B = VsB - \Delta VB2 - Vcom \tag{11b}$$

$$V3B = VsB - \Delta VB3 - Vcom \tag{11c}$$

where VsB is a voltage of a data signal supplied to the sub pixel electrodes of the B pixel 12 at a time at which the TFT1G through the TFT3G are changed to the conducting state, and where ΔVG2 and ΔVG3 are expressed by equations (12a) and (12b), respectively.

$$\Delta VB2 = VsB \times Cd2B/(Clc2B + Cd2B) \tag{12a}$$

$$\Delta VB3 = VsB \times Cd3B/(Clc3B + Cd3B) \tag{12b}$$

As in the R pixel 8 and the G pixel 10, in this embodiment, it is assumed that ΔVB2<ΔVB3 holds true and that V1B, V2B, and V3B satisfy VB3<VB2<VB1. Accordingly, the transmittance of the liquid crystal layer of the bright pixel 12a is higher than that of the intermediate pixel 12b and that of the dark pixel 12c, and the transmittance of the liquid crystal layer of the intermediate pixel 12b is higher than that of the dark pixel 12c. Thus, the bright pixel 12a presents a higher level of brightness than the intermediate pixel 12b and the dark pixel 12c, and the intermediate pixel 12b presents a higher level of brightness than the dark pixel 12c.

The difference ΔV12B (=V1B−V2B) in the effective voltage applied to the liquid crystal layer of the bright pixel 12a and that of the intermediate pixel 12b disposed in the B pixel is expressed by equation (13a).

$$\Delta V12B = \Delta VB2 \tag{13a}$$

The difference ΔV13B (=V1B−V3B) in the effective voltage applied to the liquid crystal layer of the bright pixel 12a and that of the dark pixel 12c disposed in the B pixel is expressed by equation (13b).

$$\Delta V13B = \Delta VB3 \tag{13b}$$

The difference ΔV23B (=V2B−V3B) in the effective voltage applied to the liquid crystal layer of the intermediate pixel 12b and that of the dark pixel 12c disposed in the B pixel is expressed by equation (13c).

$$\Delta V23B = \Delta VB3 - \Delta VB2 \tag{13c}$$

(Specific Examples of Pixel Size and Capacitance)

The sizes of individual pixels, the capacitances of individual liquid crystal capacitors, and the capacitances of individual storage capacitors in the liquid crystal panel 100 of this embodiment will be discussed below.

In this embodiment, for example, the size of the liquid crystal panel 100 may be 60 inches, and the total number of picture elements may be 3840 (horizontal direction)×2160 (vertical direction). With this configuration, the liquid crystal panel 100 may be configured such that the sizes of the R pixel 8, the G pixel 10, and the B pixel 12 forming each picture element are 115.3 μm (micrometers) (horizontal direction)× 345.9 μm (vertical direction). In this case, the liquid crystal panel 100 may be configured such that the size of the bright pixel 8a is 115.3 μm (horizontal direction)×155.6 μm (vertical direction), the size of the intermediate pixel 8b is 115.3 μm (horizontal direction)×103.8 μm (vertical direction), and the size of the dark pixel 8c is 115.3 μm (horizontal direction)× 86.5 μm (vertical direction). The G pixel 10 and the B pixel 12 are configured in a similar manner.

In this embodiment, when the area of the sub pixel electrode of the bright pixel 8a disposed in the R pixel 8 is denoted by Sa, the area of the sub pixel electrode of the intermediate pixel 8b disposed in the R pixel 8 is denoted by Sb, and the area of the sub pixel electrode of the dark pixel 8c disposed in the R pixel 8 is denoted by Sc, Sa, Sb, and Sc satisfy the relationship expressed by the following equation.

$$Sa:Sb:Sc = 1.8:1.2:1.0$$

The liquid crystal capacitors Clc1R, Clc2R, and Clc3R of the bright pixel 8a, the intermediate pixel 8b, and the dark pixel 8c, respectively, disposed in the R pixel 8 are as follows.

Clc1R=180 pF (picofarads)
Clc2R=120 pF
Clc3R=100 pF

In this embodiment, the storage capacitors Cd2R and Cd3R of the intermediate pixel 8b and the dark pixel 8c, respectively, of the R pixel 8 are set to be values expressed as follows.

Cd2R=48 pF
Cd3R=156 pF

The area ratio of the sub pixel electrodes and the capacitances of the G pixel 10 and those of the B pixel 12 are set similarly to those of the R pixel 8.

When the capacitances are set as described above, ΔVR2 and ΔVR3 defined by mathematical equations (4a) and (4b), respectively, are expressed by equations (4a') and (4b'), respectively.

$$\Delta VR2 = VsR \times 48/(120+48) = VsR \times 2/7 \tag{4a'}$$

$$\Delta VR3 = VsR \times 156/(100+156) = VsR \times 39/64 \tag{4b'}$$

Accordingly, ΔVR2<ΔVR3 holds true.

ΔVG2, ΔVG3, ΔVB2, and ΔVB3 are expressed in a similar manner.

(Threshold Voltage of Liquid Crystal)

The liquid crystal layer (liquid crystal) disposed in each pixel has a threshold voltage Vth which is not 0. The threshold voltage is a voltage at which the orientation of a liquid crystal starts to change as a voltage applied to the liquid crystal increases. A pixel provided in a VA-mode liquid crystal display device, such as that used in this embodiment, does not present brightness when the voltage applied to the liquid crystal of the pixel is equal to or smaller than the threshold voltage, and starts to present brightness when the voltage applied to the liquid crystal exceeds the threshold voltage.

In this embodiment, a description will be given, assuming that the threshold voltage Vth is 2.0 V. However, the specific value of the threshold voltage is dependent on the characteristics of a liquid crystal to be used and a specific structure of pixels, and this embodiment is not restricted by a specific value of the threshold voltage.

(2D Display Mode)

A description will be given below, with reference to parts (a) through (c) of FIG. 5, of the brightness presented by each pixel when the 2D display mode is selected, that is, when the control circuit 20 refers to the look-up table used for the 2D display mode.

Part (a) of FIG. 5 shows an example of the look-up table LUT1 which is referred to by the control circuit 20 when the 2D display mode is selected.

As shown in part (a) of FIG. 5, in the look-up table LUT1 used for the 2D display mode, the data voltage corresponding to 255 tone levels (maximum tone), is 7.6 V (volts), and the data voltage corresponding to each tone level is represented by an increasing function of the tone level. Additionally, in the look-up table LUT1 shown in part (a) of FIG. 5, the tone level is set so that the γ (gamma) value at the front-side viewing angle may be 2.2.

When the data voltage corresponding to 255 tone levels in the look-up table LUT1 is supplied via the source bus line 4, the effective voltages V1R, V2R, and V3R applied to the liquid crystal layers of the bright pixel 8a, the intermediate pixel 8b, and the dark pixel 8c of the R pixel 8, respectively, are calculated as follows. VsR=7.6 is substituted into mathematical equations (4a') and (4b'), and mathematical equations (4a') and (4b') are reduced to equations (4a'') and (4b''), respectively.

$$\Delta VR2 = 7.6 \times 2/7 = 2.17 \text{ (V)} \tag{4a''}$$

$$\Delta VR3 = 7.6 \times 39/64 = 4.63 \text{ (V)} \tag{4b''}$$

Accordingly, the effective voltages V1R, V2R, and V3R are expressed by equations (6a''), (6b''), and (6c''), respectively.

$$V1R = 7.6 \text{ (V)} \tag{6a''}$$

$$V2R = 7.6 - 2.17 = 5.43 \text{ (V)} \tag{6b''}$$

$$V3R = 7.6 - 4.63 = 2.97 \text{ (V)} \tag{6c''}$$

In this case, Vcom is assumed to be 0.

As represented by mathematical equations (6a'') through (6c''), the voltages effectively applied to the liquid crystal layers of the bright pixel 8a, the intermediate pixel 8b, and the dark pixel 8c, respectively, are all greater than the threshold voltage Vth. Thus, when the control circuit 20 refers to the look-up table LUT1, that is, when the 2D display mode is selected, the bright pixel 8a, the intermediate pixel 8b, and the dark pixel 8c all present brightness. This also applies to the G pixel 10 and the B pixel 12.

Part (b) of FIG. 5 is a graph indicating tone level-brightness characteristics concerning the bright pixel 8a (indicated by "A" in part (b) of FIG. 5), tone level-brightness characteristics concerning the intermediate pixel 8b (indicated by "B" in part (b) of FIG. 5), and tone level-brightness characteristics concerning the dark pixel 8c (indicated by "C" in part (b) of FIG. 5) in the 2D display mode. In part (b) of FIG. 5, "A+B" indicates the total brightness of the bright pixel and the intermediate pixel, and "Total" indicates the total brightness of the bright pixel, the intermediate pixel, and the dark pixel. As is seen from part (b) of FIG. 5, the dark pixel presents brightness with respect to 225 tone levels or higher. The bright pixel 8a presents a higher level of brightness than the intermediate pixel 8b and the dark pixel 8c, and the intermediate pixel 8b presents a higher level of brightness than the dark pixel 8c. This also applies to the G pixel 10 and the B pixel 12.

As shown in part (b) of FIG. 5, in the 2D display mode, the brightness of the dark pixel contributes to about 10% of the total brightness of the bright pixel, the intermediate pixel, and the dark pixel around 255 tone levels (maximum tone).

Accordingly, in the liquid crystal display device 1 of this embodiment, in the 2D display mode, the brightness is enhanced by about 10%, compared with a configuration in which black matrixes which do not present brightness in any of the display modes are disposed, instead of dark pixels.

Part (c) of FIG. 5 schematically shows brightness levels presented by the sub pixels disposed in the R pixel 8, the G pixel 10, and the B pixel 12 in the 2D display mode. As shown in part (c) of FIG. 5, the bright pixel, the intermediate pixel, and the dark pixel disposed in each of the R pixel 8, the G pixel 10, and the B pixel 12 all present brightness. As stated above, the bright pixel presents a higher level of brightness than the intermediate pixel and the dark pixel, and the intermediate pixel presents a higher level of brightness than the dark pixel.

(3D Display Mode)

A description will be given below, with reference to parts (a) through (c) of FIG. 6, of the brightness presented by each pixel when the 3D display mode is selected, that is, when the control circuit 20 refers to the look-up table used for the 3D display mode.

Part (a) of FIG. 6 shows an example of the look-up table LUT2 which is referred to by the control circuit 20 when the 3D display mode is selected.

As shown in part (a) of FIG. 6, in the look-up table LUT2 used for the 3D display mode, the data voltage corresponding to 255 tone levels (maximum tone), is 5.1 V (volts), and the data voltage corresponding to each tone level is represented by an increasing function of the tone level. Additionally, in the look-up table LUT2 shown in part (a) of FIG. 6, the tone level is set so that the γ (gamma) value at the front-side viewing angle may be 2.2.

When the data voltage corresponding to 255 tone levels in the look-up table LUT2 is supplied via the source bus line 4, the effective voltages V1R, V2R, and V3R applied to the liquid crystal layers of the bright pixel 8a, the intermediate pixel 8b, and the dark pixel 8c of the R pixel 8, respectively, are calculated as follows. VsR=5.1 is substituted into mathematical equations (4a') and (4b'), and mathematical equations (4a') and (4b') are reduced to equations (4a''') and (4b'''), respectively.

$$\Delta VR2 = 5.1 \times 2/7 = 1.46 \text{ (V)} \tag{4a'''}$$

$$\Delta VR3 = 5.1 \times 39/64 = 3.11 \text{ (V)} \tag{4b'''}$$

Accordingly, the effective voltages V1R, V2R, and V3R are expressed by equations (6a'), (6b'), and (6c'), respectively.

$$V1R = 5.1 \text{ (V)} \tag{6a'}$$

$$V2R = 5.1 - 1.46 = 3.64 \text{ (V)} \tag{6b'}$$

$$V3R = 5.1 - 3.11 = 1.99 \text{ (V)} \tag{6c'}$$

In this case, Vcom is assumed to be 0.

As represented by mathematical equations (6a') through (6c'), the voltages effectively applied to the liquid crystal layers of the bright pixel 8a and the intermediate pixel 8b are greater than the threshold voltage Vth, while the voltage effectively applied to the liquid crystal layer of the dark pixel 8c is smaller than the threshold voltage Vth. Thus, when the control circuit 20 refers to the look-up table LUT2, that is, when the 3D display mode is selected, the bright pixel 8a and the intermediate pixel 8b present brightness, however, the dark pixel 8c does not present brightness even when the data voltage corresponding to the maximum tone is supplied. Accordingly, when the 3D display mode is selected, the dark pixel 8c of the R pixel 8 functions as a black matrix. Similarly, when the 3D display mode is selected, the dark pixel 10c of the G pixel 10 and the dark pixel 12c of the B pixel 12 function as black matrixes.

Part (b) of FIG. 6 is a graph indicating tone level-brightness characteristics concerning the bright pixel 8a (indicated by "A" in part (b) of FIG. 6), tone level-brightness characteristics concerning the intermediate pixel 8b (indicated by "B" in part (b) of FIG. 6), and tone level-brightness characteristics concerning the dark pixel 8c (indicated by "C" in part (b) of FIG. 6) in the 3D display mode. In part (b) of FIG. 6, "Total" indicates the total brightness of the bright pixel, the intermediate pixel, and the dark pixel. As is seen from part (b) of FIG. 6, the dark pixel does not present brightness even with respect to 225 tone levels (maximum tone). The bright pixel 8a presents a higher level of brightness than the intermediate pixel 8b. This also applies to the G pixel 10 and the B pixel 12.

Part (c) of FIG. 6 schematically shows brightness levels presented by the sub pixels disposed in the R pixel 8, the G pixel 10, and the B pixel 12 in the 3D display mode. As shown in part (c) of FIG. 6, in each of the R pixel 8, the G pixel 10, and the B pixel 12, the bright pixel presents a higher level of brightness than the intermediate pixel, and the dark pixel functions as a black matrix. If the specific size of the dark pixel is the size described above, the dark pixel functions as a black matrix having a vertical width of 86.5 μm.

In the 3D display mode, the look-up table which is referred to by the control circuit 20 is not restricted to the LUT2 shown in part (a) of FIG. 6. Generally, as the look-up table which is referred to by the control circuit 20 in the 3D display mode, any look-up table may be used as long as it specifies VsR, VsG, and VsB so that V3R, V3G, and V3G represented by mathematical equations (6c), (8c), and (11c), respectively, will be all equal to or smaller than Vth with respect to the maximum tone.

In the above-described example, a description has been given, such that Cd2R=48 pF and Cd3R=156 pF. However, if polarity inversion driving is performed in which data signals having opposite polarities are supplied to an Nf-th frame and an (Nf+1)-th frame, the capacitances of the storage capacitors Cd2R and Cd3R may be set smaller. Even in this case, advantages similar to those described above can be obtained. More specifically, if the look-up table LUT2 shown in part (a) of FIG. 6 is used for a positive data signal, and if a look-up table indicating data voltages having a polarity inverted from that of the data voltages in the look-up table LUT2 shown in part (a) of FIG. 6 is used for a negative data signal, each dark pixel functions as a black matrix even if the capacitance Cd2R is reduced to 24 pF and the capacitance Cd3R is reduced to 70 pF.

(Effect of Suppressing Crosstalk in 3D Display Mode)

The effect of suppressing the occurrence of crosstalk by using the liquid crystal display device 1 when the 3D display mode is selected will be discussed below.

Figure 7:
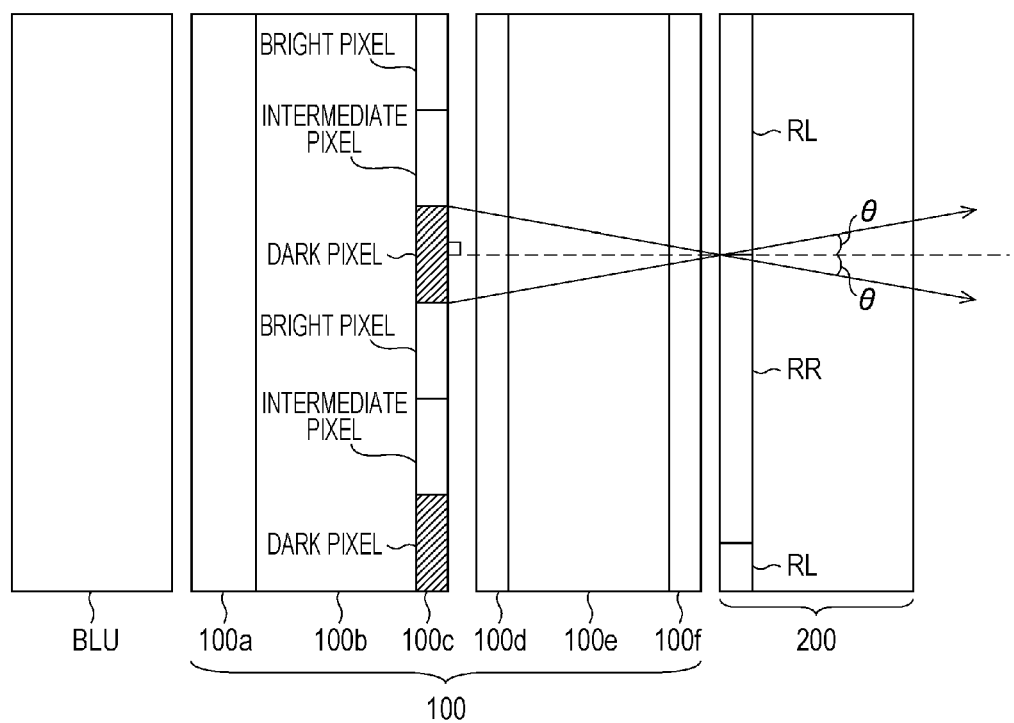
FIG. 7 is a sectional view, along a straight line parallel with source bus lines, of a backlight unit, a liquid crystal panel, and a patterned retarder when the 3D display mode is selected in the liquid crystal display device according to this embodiment of the present invention.

FIG. 7 is a sectional view illustrating, by way of example, the backlight unit BLU, the liquid crystal panel 100, and the patterned retarder 200, having a cross section parallel with the source bus lines 4. In the example shown in FIG. 7, the liquid crystal panel 100 includes a first polarizing sheet 100a, a TFT-Glass 100b, a TFT substrate 100c, a color filter 100d, a CF-Glass 100e, and a second polarizing sheet 100f. The TFTs, the liquid crystal capacitors, and the storage capacitors of the individual pixels are formed on the TFT substrate 100c.

The polarization state of light which has emitted from the backlight unit BLU and which has passed through the liquid crystal panel 100 is such that it has been transformed into linearly polarized light due to the function of the second polarizing sheet 100f.

The patterned retarder 200 includes two types of retarder plates RR and RL on the side opposing the liquid crystal panel 100. The retarder plates RR convert linearly polarized light into right-handed circularly polarized light, while the retarder plates RL convert linearly polarized light into left-handed circularly polarized light. The boundary between the retarder plates RR and RL is set such that a line perpendicularly extending from the boundary to the TFT substrate 100c intersects with a dark pixel.

The boundary between the retarder plates RR and RL is preferably set such that a line perpendicularly extending from the boundary to the TFT substrate 100c intersects with a straight line which equally divides a dark pixel into two portions in the vertical direction. With this setting, the effect of suppressing the occurrence of crosstalk can be enhanced.

As stated above, in the 3D display mode, since dark pixels do not present brightness, they function as black matrixes.

As shown in FIG. 7, out of the amount of light emitting from an intermediate pixel disposed at the back side of the retarder plate RL, light emitting from and near the boundary between the intermediate pixel and the dark pixel passes through the retarder plate RL if the angle between the propagation direction of the light and the direction of a normal to the liquid crystal panel is within θ (theta) degrees in the vertically downward direction of the liquid crystal panel. Similarly, out of the amount of light emitting from a bright pixel disposed at the back side of the retarder plate RR, light emitting from and near the boundary between the bright pixel and the dark pixel passes through the retarder plate RR if the angle between the propagation direction of the light and the direction of a normal to the liquid crystal panel is within θ (theta) degrees in the vertically upward direction of the liquid crystal panel.

Accordingly, in the liquid crystal display device 1, as shown in FIG. 7, if the angle between the direction of a normal to the liquid crystal panel 100 and a viewing direction is within θ degrees along the vertical direction of the liquid crystal panel, it is possible to suppress the occurrence of crosstalk.

In the 2D display mode, the dark pixels provided in the liquid crystal display device 1 present brightness, and thus, the brightness of a displayed image is enhanced, compared with a configuration in which black matrixes which do not present brightness in any of the display modes are disposed, instead of dark pixels.

The configurations of the liquid crystal panel 100 and the patterned retarder 200 of this embodiment are not restricted to the examples shown in FIG. 7. For example, a black stripe having a width smaller than the vertical width of a dark pixel may be disposed around a boundary between retarder plates RR and RL. With this configuration, due to the presence of a black stripe, the effect of suppressing the occurrence of crosstalk can be enhanced. The vertical width of a black stripe is smaller than that of a dark pixel, and thus, the brightness of a displayed image is enhanced, compared with a configuration in which black matrixes which do not present brightness in any of the display modes are disposed, instead of dark pixels.

As discussed above, by using the liquid crystal display device 1 of this embodiment, in the 3D display mode, after the application of a common data voltage to the liquid crystal layers of the individual sub pixels, the voltage applied to the liquid crystal layer of a dark pixel is changed, thereby enabling the dark pixel to function as a black matrix. In contrast, in a known configuration in which data voltages are separately supplied to a dark pixel and sub pixels other than the dark pixel, it is necessary that data bus lines for supplying the data voltages to the dark pixel and to the sub pixels other than the dark pixel be provided.

By using the liquid crystal display device 1 of this embodiment, the number of data bus lines can be reduced by half or less of that of such a known configuration.

(Effect of Suppressing Color Shift)

In the liquid crystal display device 1 of this embodiment, each of the R pixel 8, the G pixel 10, and the B pixel 12 includes three sub pixels (a bright pixel, an intermediate pixel, and a dark pixel), and the sub pixels present different levels of brightness, thereby implementing an effect of suppressing the phenomenon of a color shift occurring in a display image. The color shift is a phenomenon in which when a display image is viewed in an oblique direction, the color hue of the display image is changed from that when the display image is viewed from the front side. The effect of reducing the color shift by using the liquid crystal display device 1 will be discussed below.

(XYZ Color System)

A color system, which is a system representing colors quantitatively, will first be discussed below. A typical color system is an RGB color system using three primary colors, that is, red (R), green (G), and blue (B). However, it is not always possible that the RGB color system represents all perceivable colors completely. For example, a single-wavelength color, such as laser light, is positioned outside the RGB color system. If the use of negative values for coefficients of RGB values is allowed, certain colors can be represented in the RGB color system. However, the handling of such an RGB color system is not convenient. Therefore, an XYZ color system, which has been developed by improving the RGB color system, is generally used.

In the XYZ color system, a desired color is represented by a combination of tristimulus values (X, Y, and Z values). The X, Y, and Z values, which are new stimulus values, can be obtained by adding the R, G, and B values to each other. A combination of these tristimulus values can represent all of specific spectral colors, mixed spectral light colors, and object colors.

Among the X, Y, and Z values, the Y value corresponds to a stimulus to lightness. That is, the Y value can be used as a representative value of the lightness. The X value is a stimulus which represents mainly red but contains a certain amount of color stimulus in a blue wavelength range. The Z value is a color stimulus which represents mainly blue but contains a certain amount of color stimulus in green and red wavelength ranges.

A mixed color of red, green, and blue displayed by pixels as in this embodiment, and yellow can also be represented by using the above-described XYZ color system.

(Tone Level-Local γ Characteristics)

A description will now be given, by referring to tone level-local γ characteristics, of the effect of reducing a color shift by using the liquid crystal display device 1.

Figure 8:
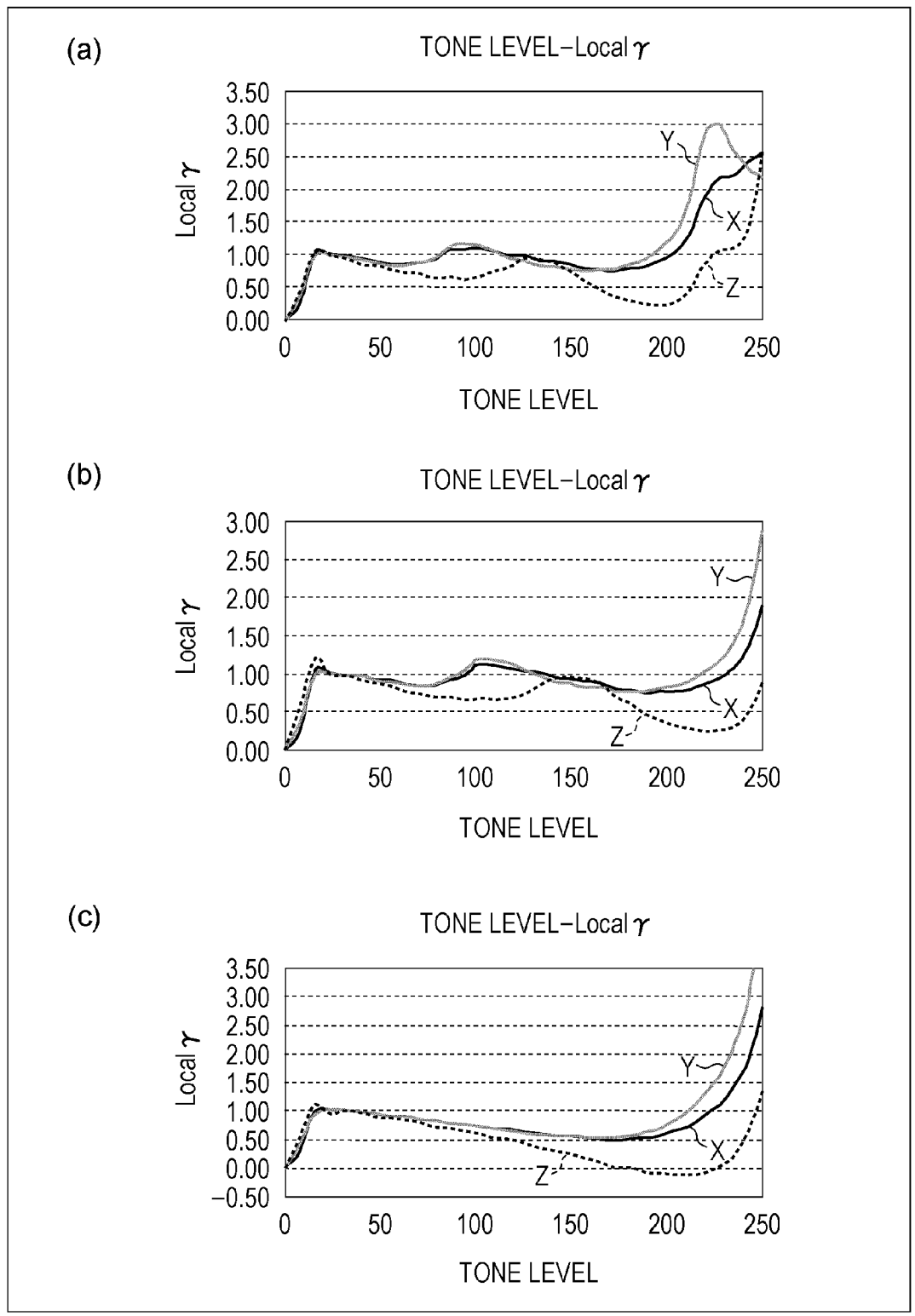
FIG. 8 shows diagrams illustrating the effect of suppressing the phenomenon of a color shift by using the liquid crystal display device of this embodiment: part (a) is a graph illustrating tone level-local γ characteristics when the 2D display mode is selected in the liquid crystal display device of this embodiment; part (a) is a graph illustrating tone level-local γ characteristics when the 3D display mode is selected in the liquid crystal display device of this embodiment; and part (c) is a graph illustrating tone level-local γ characteristics of a liquid crystal display device of a comparative example.

Part (a) of FIG. 8 is a graph illustrating tone level-local γ characteristics at an oblique viewing angle (more specifically, a polar angle of 60 degrees) concerning the X, Y, and Z values when the liquid crystal display device 1 of this embodiment displays an image in the 2D display mode. The polar angle is an angle between a viewing direction and the direction of a normal to the liquid crystal panel 100. When the polar angle is 0 degrees, it means that a user views the liquid crystal panel 100 from the front side.

Local γ is an index indicating a local gradient of the γ value. This will be described more specifically below. It is assumed that the maximum brightness indicated by optical characteristics measured from a predetermined angle with respect to the direction of a normal to a display screen is T, and when the brightness with respect to a tone value a and the brightness with respect to a tone value b (a and b are different values) indicated by the optical characteristics measured from the predetermined angle with respect to the direction of a normal to the display screen are ta and tb, respectively. It is also assumed that the brightness ratio of the brightness ta to the maximum brightness T and the brightness ratio of the brightness tb to the maximum brightness T are Ta and Tb, respectively. In this case, local γ is defined by equation (A1).

$$\text{local } \gamma = (\log(Ta) - \log(Tb))/(\log(a) - \log(b)) \quad (A1)$$

In order to prevent the occurrence of a color shift, it is desirable that the local γ value is constant even when the viewing angle is an oblique viewing angle. This is because the local γ value is adjusted to be constant when the viewing angle is a front-side viewing angle.

As shown in part (a) of FIG. 8, in the 2D display mode, both of the local γ value concerning the X value and the local γ value concerning the Y value are gradually on the decrease from around 15 tone levels to around 70 tone levels, but are changed on the increase around 70 tone levels. This is because the brightness presented by intermediate pixels contributes in 70 tone levels or greater.

Moreover, as shown in part (a) of FIG. 8, in the 2D display mode, the local γ value concerning the Z value is gradually on the decrease from around 15 tone levels to around 100 tone levels, but is changed on the increase around 100 tone levels. This is because the brightness presented by intermediate pixels contributes to the local γ value concerning the Z value in 100 tone levels or greater.

In this manner, in the liquid crystal display device 1, an intermediate pixel is provided in each color pixel. Thus, in the 2D display mode, both of the local γ value concerning the X value and the local γ value concerning the Y value are maintained at substantially constant in a range from around 15 tone levels to around 210 tone levels.

Part (b) of FIG. 8 is a graph illustrating tone level-local γ characteristics at a polar angle of 60 degrees concerning the X, Y, and Z values when the liquid crystal display device 1 of this embodiment displays an image in the 3D display mode.

In the 3D display mode, dark pixels do not present brightness and function as black stripes. However, as stated above, bright pixels and intermediate pixels present brightness. The bright pixels present a higher level of brightness than the intermediate pixels.

As shown in part (b) of FIG. 8, in the 3D display mode, both of the local γ value concerning the X value and the local γ value concerning the Y value are gradually on the decrease from around 15 tone levels to around 70 tone levels, but are changed on the increase around 70 tone levels. This is because the brightness presented by intermediate pixels contributes in 70 tone levels or greater.

Moreover, as shown in part (b) of FIG. 8, in the 2D display mode, the local γ value concerning the Z value is gradually on the decrease from around 15 tone levels to around 100 tone levels, but is changed on the increase around 100 tone levels. This is because the brightness presented by intermediate pixels contributes to the local γ value concerning the Z value in 100 tone levels or greater.

In this manner, in the liquid crystal display device 1, an intermediate pixel is provided in each color pixel. Thus, in the 3D display mode, both of the local γ value concerning the X value and the local γ value concerning the Y value are maintained at substantially constant in a range from around 15 tone levels to around 230 tone levels.

Part (c) of FIG. 8 is a graph illustrating tone level-local γ characteristics at a polar angle of 60 degrees concerning the X, Y, and Z values in a liquid crystal display device of a comparative example.

Unlike the liquid crystal display device 1 of this embodiment, in the liquid crystal display device of this comparative example, sub pixels are not provided in each color pixel, and each pixel is constituted by a single type of pixel. That is, in the liquid crystal display device of this comparative example, each color pixel is constituted only by a pixel corresponding to a bright pixel used in the liquid crystal display device 1.

As shown in part (c) of FIG. 8, in the liquid crystal display device of this comparative example, both of the local γ value concerning the X value and the local γ value concerning the Y value are gradually on the decrease from around 15 tone levels to around 180 tone levels, and there is no rise around 80 tone levels, unlike the liquid crystal display device 1 of this embodiment. This is because, in the liquid crystal display device of this comparative example, each color pixel does not include sub pixels and is constituted only by a single type of pixel, unlike liquid crystal display device 1 of this embodiment.

For a similar reason, as shown in part (c) of FIG. 8, in the liquid crystal display device of this comparative example, the local γ value concerning the Z value is gradually on the decrease from around 15 tone levels to around 220 tone levels, and there is no rise around 100 tone levels, unlike the liquid crystal display device 1 of this embodiment.

Figure 9:
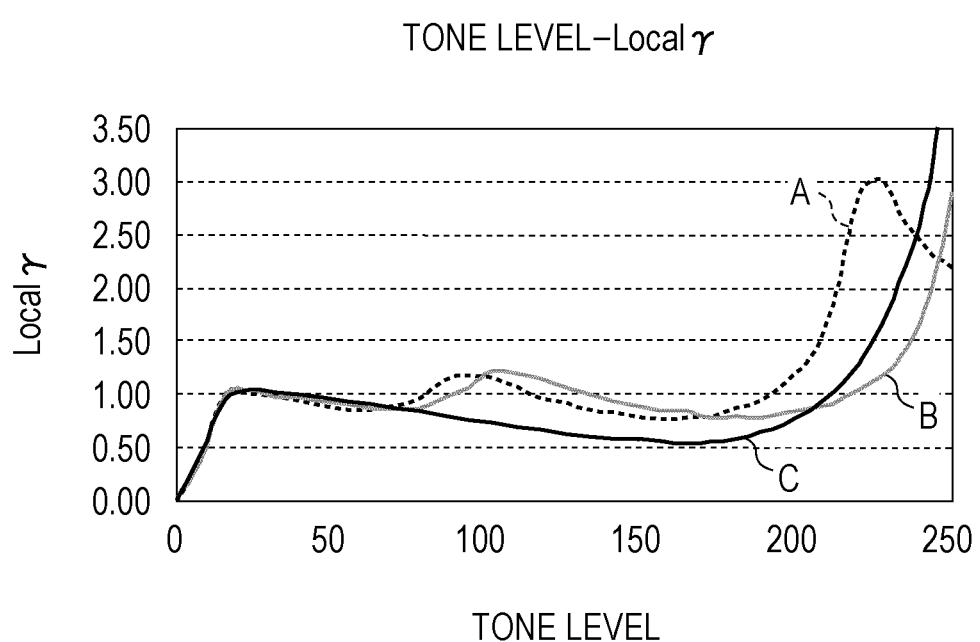
FIG. 9 is a graph illustrating tone level-local γ characteristics concerning the Y value when the 2D display mode is selected and when the 3D display mode is selected in the liquid crystal display device of this embodiment and those in the liquid crystal display device of the comparative example.

FIG. 9 is a diagram illustrating tone level-local γ characteristics concerning the Y value in the 2D display mode and the 3D display mode using the liquid crystal display device 1 of this embodiment and in the liquid crystal display device of the comparative example. "A" in FIG. 9 indicates tone level-local γ characteristics in the 2D display mode using the liquid crystal display device 1, "B" in FIG. 9 indicates tone level-local γ characteristics in the 3D display mode using the liquid crystal display device 1, and "C" in FIG. 9 indicates tone level-local γ characteristics in the liquid crystal display device of the comparative example.

As is seen from FIG. 9, both of the local γ value in the 2D display mode using the liquid crystal display device 1 and the local γ value in the 3D display mode using the liquid crystal display device 1 are more constant than the local γ value in the liquid crystal display device of the comparative example.

Accordingly, in the liquid crystal display device 1 of this embodiment, both in the 2D display mode and in the 3D display mode, the phenomenon of a color shift is suppressed to a greater degree than the liquid crystal display device of the comparative example in which sub pixels are not provided.

In this manner, by using the liquid crystal display device 1 of this embodiment, the occurrence of crosstalk can be suppressed while maintaining the brightness of a display image in the 2D display mode, and also, the phenomenon of a color shift can also be suppressed.

First Modified Example

A description has been given above, such that dark pixels provided in the liquid crystal display device 1 do not present brightness in the 3D display mode. However, this embodiment is not restricted by this configuration. For example, in the 3D display mode, the liquid crystal display device 1 is driven so that the brightness presented by dark pixels may be equal to or smaller than a predetermined brightness level. With this setting, the occurrence of crosstalk can also be reduced.

A description will be given below, by changing the drawing for reference, of a case in which the liquid crystal display device 1 is driven so that the brightness presented by dark pixels may be equal to or smaller than a predetermined brightness level.

Figure 10:
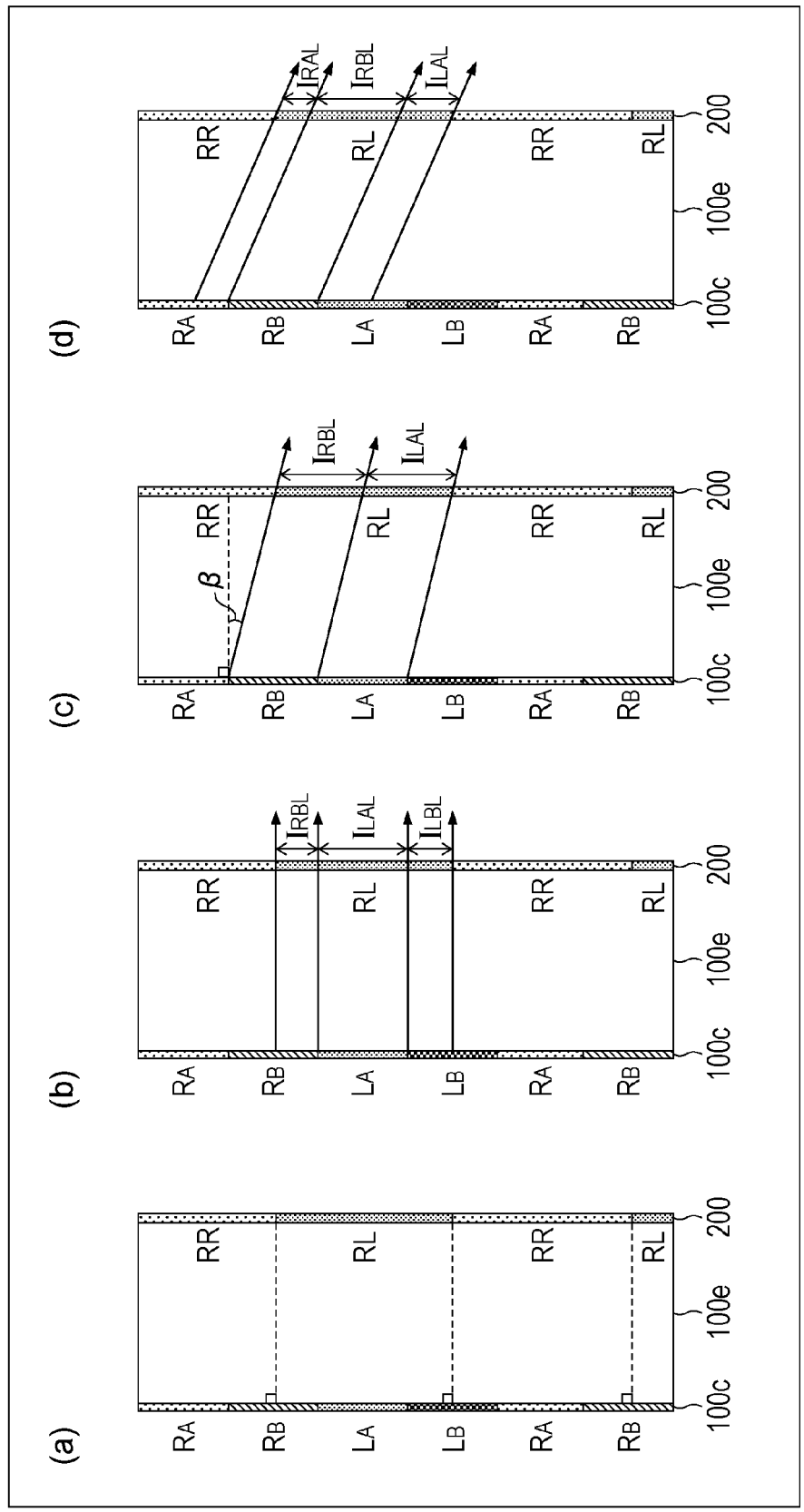
FIG. 10 shows a case in which the liquid crystal display device of this embodiment is driven so that the brightness presented by dark pixels may be equal to or smaller than a predetermined brightness level: part (a) is a sectional view showing part of the liquid crystal panel and part of the patterned retarder; part (b) shows image light viewed by a viewer when the viewing direction is a direction of a normal to the liquid crystal panel; part (c) shows image light viewed by a viewer when the angle between a viewing direction and the direction of a normal to the liquid crystal panel, the angle being along the vertical direction of the liquid crystal panel, is a predetermined angle β (beta); and part (d) shows image light viewed by a viewer when the angle between a viewing direction and the direction of a normal to the liquid crystal panel, the angle being along the vertical direction of the liquid crystal panel, is greater than a predetermined angle.
Figure 11:
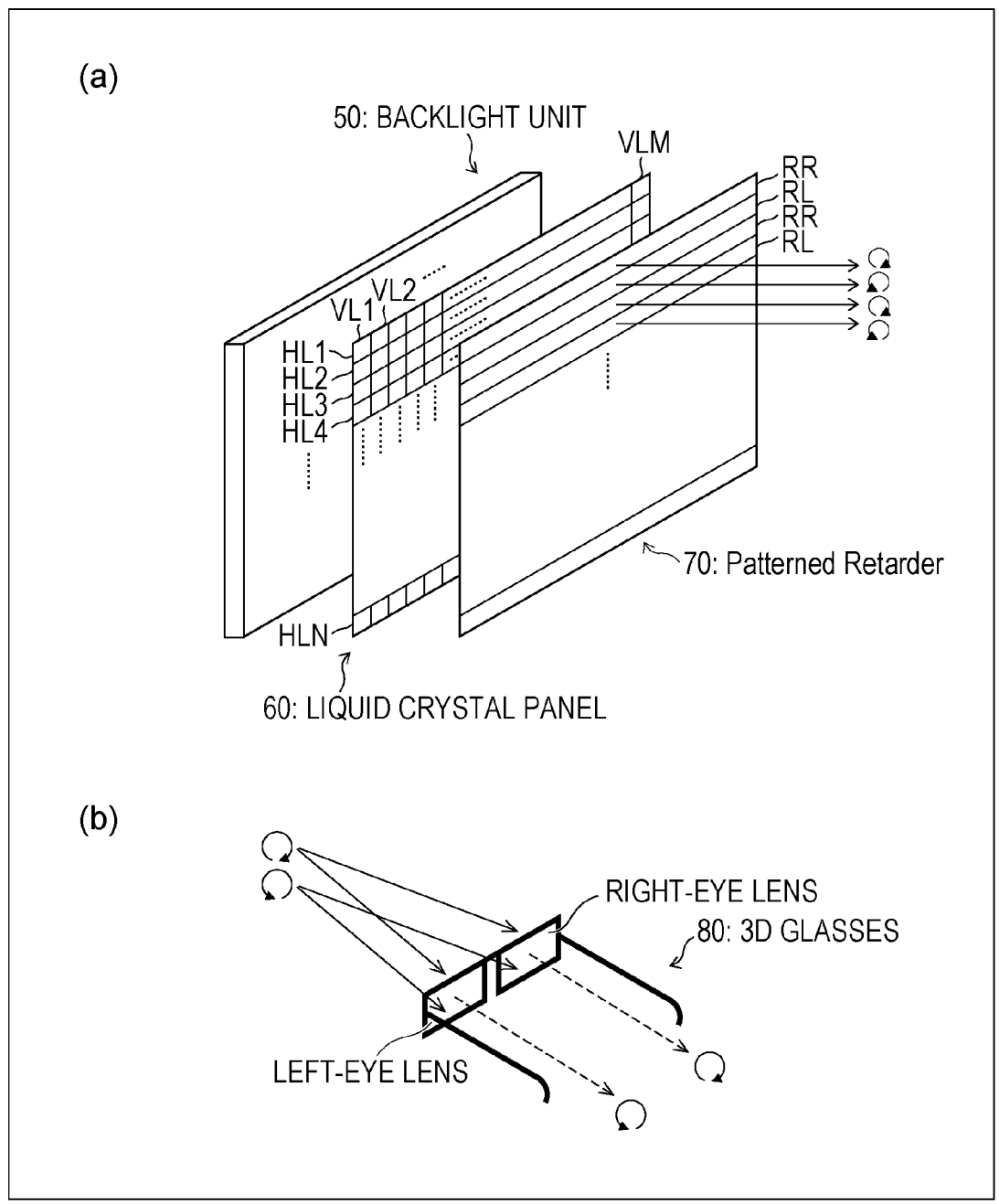
FIG. 11 illustrates a known liquid crystal display device: part (a) is an exploded perspective view illustrating a backlight unit, a liquid crystal panel, and a patterned retarder included in the known liquid crystal display device; and part (b) shows 3D glasses used together with the known liquid crystal display device.
Figure 12:
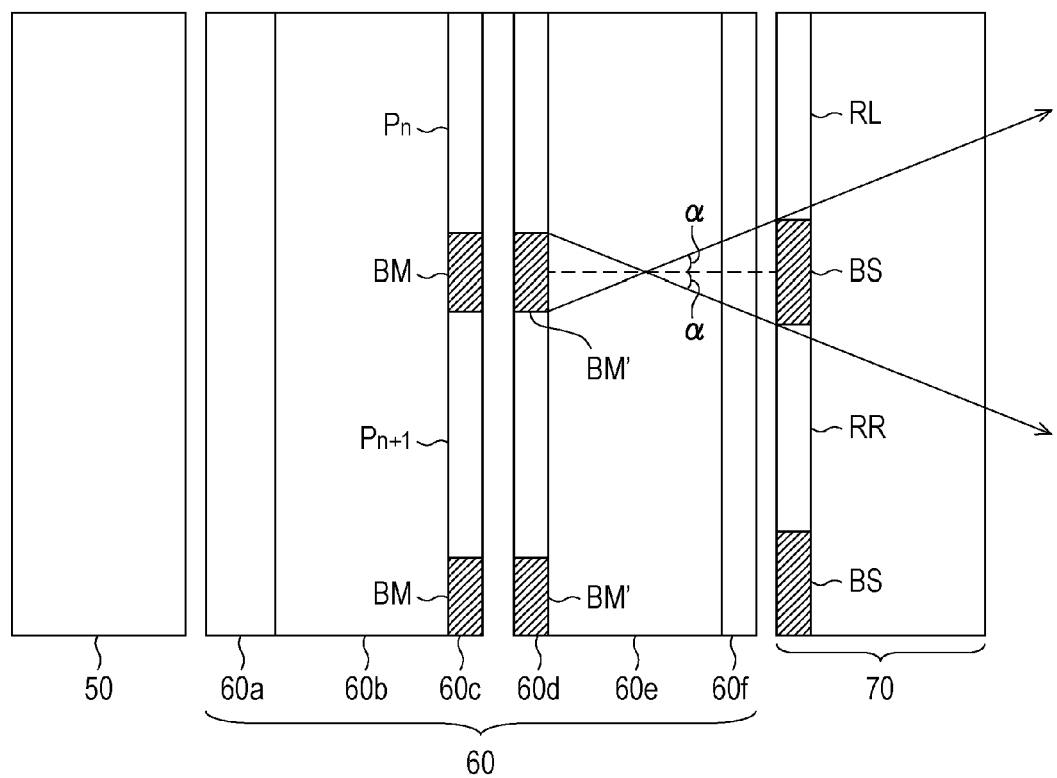
FIG. 12 is a sectional view, along a straight line parallel with a vertical scanning line, of the backlight unit, the liquid crystal panel, and the patterned retarder included in the known liquid crystal display device.

Parts (a) through (d) of FIG. 10 show a case in which liquid crystal display device 1 is driven so that the brightness presented by dark pixels may be equal to or smaller than a predetermined brightness level. Part (a) is a sectional view showing part of the liquid crystal panel 100 and part of the patterned retarder 200. Part (b) shows image light viewed by a viewer when the viewing direction is a direction of a normal to the liquid crystal panel 100. Part (c) shows image light viewed by a viewer when the angle between a viewing direction and the direction of a normal to the liquid crystal panel 100, the angle being along the vertical direction of the liquid crystal panel 100, is a predetermined angle β (beta). Part (d) shows image light viewed by a viewer when the angle between a viewing direction and the direction of a normal to the liquid crystal panel 100, the angle being along the vertical direction of the liquid crystal panel 100, is greater than the predetermined angle β.

In parts (a) through (d) of FIG. 10, RB indicates a dark pixel which displays a right-eye image, and RA indicates a combination of sub pixels, that is, a bright pixel and an intermediate pixel which display a right-eye image. Similarly, LB indicates a dark pixel which displays a left-eye image, and LA indicates a combination of sub pixels, that is, a bright pixel and an intermediate pixel which display a left-eye image. The dark pixels RB and LB each correspond to one of the dark pixels 8c, 10c, and 12c. The sub pixels RA and LA each correspond to one of a combination of (the bright pixel 8a and the intermediate pixel 8b), (the bright pixel 10a and the intermediate pixel 10b), and (the bright pixel 12a and the intermediate pixel 12b).

In the following description, as shown in part (a) of FIG. 10, the boundary between the retarder plates RR and RL is set such that a line perpendicularly extending from the boundary to the TFT substrate 100c intersects with a straight line which equally divides a dark pixel into two portions in the vertical direction. With this setting, the effect of reducing the occurrence of crosstalk can be enhanced.

As shown in part (c) of FIG. 10, the above-described predetermined angle β is an angle between a normal to the liquid crystal panel 100 and a straight line passing through both of (1) the boundary between the sub pixel RA and the dark pixel RB and (2) a portion of the boundary between the retarder plates RR and RL which is positioned closest to the dark pixel RB. The angle β is also an angle along the vertical direction of the liquid crystal panel 100. The angle β in part (c) of FIG. 10 corresponds to the angle θ in FIG. 7.

As shown in parts (b) through (d) of FIG. 10, the brightness of image light emitting from the dark pixel RB and passing through the retarder plate RL is represented by IRBL, the brightness of image light emitting from the sub pixel LA and passing through the retarder plate RL is represented by ILAL, the brightness of image light emitting from the dark pixel LB and passing through the retarder plate RL is represented by ILBL, and the brightness of image light emitting from the sub pixel RA and passing through the retarder plate RL is represented by IRAL.

The brightness IRBL, the brightness ILAL, the brightness ILBL, and the brightness IRAL are effective brightness levels of image light emitting from the associated sub pixels and passing through the retarder plates, that is, brightness levels after time T4 in the timing chart shown in FIG. 4.

The image light emitting from the dark pixel RB and passing through the retarder plate RL is image light which may cause crosstalk, and the image light emitting from the sub pixel LA and passing through the retarder plate RL and the image light emitting from the dark pixel LB and passing through the retarder plate RL are items of image light which do not cause crosstalk.

As shown in parts (b) and (c) of FIG. 10, when the angle between a viewing direction and the direction of a normal to the liquid crystal panel 100, the angle being along the longitudinal direction of the liquid crystal panel 100, is β or smaller, the brightness IRAL is 0. As shown in part (d) of FIG. 10, when the angle between a viewing direction and the direction of a normal to the liquid crystal panel 100, the angle being along the longitudinal direction of the liquid crystal panel 100, is greater than β, the brightness IRAL is not generally 0.

The inventors have discovered by experiment that, if the level of crosstalk is equal to or smaller than an amount of ±3 tone levels when 32 tone levels are displayed, a viewer does not recognize such crosstalk as crosstalk. The amount of ±3 tone levels when 32 tone levels are displayed corresponds to a brightness difference of 20%.

According to the above-described discovery made by the inventors, the liquid crystal display device 1 preferably drives the sub pixels so that the following inequality (A2) may hold true in a viewing direction in which the brightness IRAL is 0.

$$IRBL/(ILAL+ILBL)<0.2 \tag{A2}$$

It is preferable that the inequality (A2) also holds true in the case of the maximum tone, that is, when the data voltage supplied to each sub pixel takes a maximum value.

In other words, the liquid crystal display device 1 may preferably drive the sub pixels so that, when the angle between a viewing direction and the direction of a normal to the liquid crystal panel 100, the angle being along the longitudinal direction of the liquid crystal panel 100, is the above-described angle β or smaller, the brightness of image light which has emitted from the liquid crystal panel 100 in the viewing direction and passed through the retarder plate RL and which may cause crosstalk will be smaller than 20% of the brightness of image light which has emitted from the liquid crystal panel 100 in the viewing direction and passed through the retarder plate RL and which does not cause crosstalk.

Similarly, the liquid crystal display device 1 may preferably drive the sub pixels so that, when the angle between a viewing direction and the direction of a normal to the liquid crystal panel 100, the angle being along the longitudinal direction of the liquid crystal panel 100, is the above-described angle β or smaller, the brightness of image light which has emitted from the liquid crystal panel 100 in the viewing direction and passed through the retarder plate RR and which may cause crosstalk will be smaller than 20% of the brightness of image light which has emitted from the liquid crystal panel 100 in the viewing direction and passed through the retarder plate RR and which does not cause crosstalk.

The inventors have discovered that if, image light which has passed through one of the retarder plates RL and RR and which may cause crosstalk is smaller than 20% of the brightness of image light which has passed through the same retarder plate and which does not cause crosstalk, a viewer does not recognize such crosstalk as crosstalk.

Accordingly, in the above-described configuration, even when the brightness presented by dark pixels is not 0, a viewer does not recognize the occurrence of crosstalk.

The retarder plates RR and RL may be formed so that the transmittances of these plates are substantially the same. In this case, if the brightness presented by the dark pixel RB is smaller than 20% of the brightness presented by the sub pixel LA, the inequality (A2) holds true in a viewing direction in which the brightness IRAL becomes 0.

Accordingly, in this configuration, too, the occurrence of crosstalk is not recognized by a viewer.

Second Modified Example

In the foregoing description, a configuration in which the R pixel 8, the G pixel 10, and the B pixel 12 each include three sub pixels (a bright pixel, an intermediate pixel, and a dark pixel) has been discussed by way of example. However, this embodiment is not restricted to this configuration. For example, a configuration in which at least one of the R pixel 8, the G pixel 10, and the B pixel 12 does not include an intermediate pixel may be employed. That is, the number of sub pixels provided in each color pixel may be two.

Additionally, for example, the R pixel 8, the G pixel 10, and the B pixel 12 may each include a plurality of intermediate pixels. That is, the number of sub pixels provided in the pixel of each color may be four or more. In this configuration, it is preferable that different effective voltages are applied to the liquid crystal layers of the plurality of intermediate pixels so that the transmittances of the liquid crystal layers of the plurality of intermediate pixels can be different. With this arrangement, the phenomenon of a color shift can be more effectively suppressed.

(Application to Normally White Liquid Crystal Display Device)

In a normally white liquid crystal display device, as the absolute value of a voltage applied to a liquid crystal layer of a sub pixel becomes greater, the brightness presented by the sub pixel becomes smaller. Thus, when the above-described liquid crystal panel 100 is applied to a normally white liquid crystal display device, for example, the absolute value of the difference between the voltage supplied to the CS bus line 6 and the voltage Vcom of the common electrode is set to be sufficiently large so that the effective voltage applied to the liquid crystal layer of each dark pixel with respect to the maximum tone in the 3D display mode may become greater than that in the 2D display mode. In the case of the application to a normally white liquid crystal display device, too, the liquid crystal panel 100 can be configured so that the above-described mathematical expression (A2) may hold true.

APPENDIXES

As described above, a liquid crystal display device of the present invention is a liquid crystal display device that is capable of performing display in a first display mode and a second display mode. The liquid crystal display device includes: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. The liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel. The data voltage in the first display mode is set so that a maximum value of the transmittance of the liquid crystal layers of the sub pixels in the first display mode will be smaller than a maximum value of the transmittance of the liquid crystal layers of the sub pixels in the second display mode.

The liquid crystal display device of the present invention configured as described above is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel.

Accordingly, the number of data bus lines for applying a data voltage can be reduced to a smaller number than in a known configuration in which it is necessary to apply data voltages separately to the boundary-proximity sub pixel and sub pixels other than the boundary-proximity sub pixel. More specifically, if each pixel has two sub pixels, by using the liquid crystal display device of the present invention configured as described above, the number of data bus lines can be reduced by substantially half of that of the known configuration.

In the liquid crystal display device of the present invention configured as described above, the data voltage in the first display mode is set so that the maximum value of the transmittance of the liquid crystal layers of the sub pixels in the first display mode will be smaller than the maximum value of the transmittance of the liquid crystal layers of the sub pixels in the second display mode. Accordingly, the brightness presented by the boundary-proximity sub pixel in the first display mode is smaller than that in the second display mode.

Thus, in the first display mode, the occurrence of crosstalk caused by an image displayed by using boundary-proximity sub pixels when displaying an image which is viewable three-dimensionally using the patterned retarder system can be suppressed.

In the second display mode, as well as the first display mode, in each pixel, the brightness presented by the boundary-proximity sub pixel is smaller than that of pixels other than the boundary-proximity sub pixel, thereby improving viewing angle characteristics in the second display mode.

In the liquid crystal display device of the present invention, the number of sub pixels disposed in each of the pixels may preferably be three or more, and after applying the data voltage to the liquid crystal layers of the sub pixels, by changing the voltage to be applied to the liquid crystal layers of the sub pixels, the transmittances of the liquid crystal layers of the sub pixels other than the boundary-proximity sub pixel may preferably be made different from each other, as well as decreasing the transmittance of the liquid crystal layer of the boundary-proximity sub pixel.

With the above-described configuration, the brightness presented by the boundary-proximity sub pixel in the first display mode is made smaller than that in the second display mode, thereby suppressing the occurrence of crosstalk when displaying an image which is viewable three-dimensionally by using the patterned retarder system. At the same time, in the first display mode, in each pixel, the brightness levels presented by the plurality of sub pixels other than the boundary-proximity sub pixel are made different from each other, thereby enhancing viewing angle characteristics in the first display mode, as well as in the second display mode.

Additionally, with the above-described configuration, in the second display mode, the brightness levels presented by three or more sub pixels disposed in each pixel are different from each other, thereby further enhancing viewing angle characteristics in the second display mode.

In the liquid crystal display device of the present invention, in each of the pixels, the maximum value of brightness presented by the boundary-proximity sub pixel after the transmittance of the liquid crystal layer of the boundary-proximity sub pixel is decreased may preferably be smaller than 20% of the maximum value of brightness presented by the sub pixels other than the boundary-proximity sub pixel.

The inventors have discovered that, if the maximum value of brightness presented by the boundary-proximity sub pixel is smaller than 20% of the maximum value of brightness presented by the boundary-proximity sub pixel, a viewer recognizes the boundary-proximity sub pixel as a black pixel.

With the above-described configuration, in each of the pixels, the maximum value of brightness presented by the boundary-proximity sub pixel after the transmittance of the liquid crystal layer of the boundary-proximity sub pixel is decreased is smaller than 20% of the maximum value of brightness presented by the sub pixels other than the boundary-proximity sub pixel. Accordingly, a viewer recognizes the boundary-proximity sub pixel as a black pixel, that is, a black matrix.

Accordingly, with the above-described configuration, the boundary-proximity sub pixel functions as a black matrix, and thus, the occurrence of crosstalk can be more effectively suppressed.

In the liquid crystal display device of the present invention, in each of the pixels, a boundary between the boundary-proximity sub pixel and a sub pixel adjacent to the boundary-proximity sub pixel may preferably be formed along a direction of rows. If an angle obtained by projecting an angle between a viewing direction and a direction of a normal to the liquid crystal panel onto a plane having a direction of a normal perpendicular to both the direction of a normal to the liquid crystal panel and a column direction of the liquid crystal panel is equal to or smaller than an angle obtained by projecting an angle between the direction of a normal to the liquid crystal panel and a straight line which passes the boundary between the boundary-proximity sub pixel disposed in a pixel and a sub pixel disposed in the pixel adjacent to the boundary-proximity sub pixel and which passes a portion of the boundary between the first optical plate and the second optical plate positioned closest to the boundary-proximity sub pixel onto the plane having a direction of a normal perpendicular to both the direction of a normal to the liquid crystal panel and a column direction of the liquid crystal panel, in the first display mode, a maximum value of brightness of image light which emits from the boundary-proximity sub pixel in the viewing direction and which passes through one of the first optical plate and the second optical plate of the optical panel, the brightness being obtained after the transmittance of the liquid crystal layer is decreased, may be preferably smaller than 20% of a maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes.

The present inventors have also discovered that, if the brightness of image light which emits from the boundary-proximity sub pixel in the viewing direction and which passes through one of the first optical plate and the second optical plate of the optical panel is smaller than 20% of the maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes, a viewer recognizes the boundary-proximity sub pixel as a black pixel.

With the above-described configuration, therefore, a viewer recognizes the boundary-proximity sub pixel as a black pixel, that is, a black matrix.

Accordingly, with the above-described configuration, the boundary-proximity sub pixel functions as a black matrix, and thus, the occurrence of crosstalk can be more effectively suppressed.

In the liquid crystal display device of the present invention, the boundary-proximity sub pixel may preferably further include at least one storage capacitor constituted by a storage capacitor electrode and a storage capacitor common electrode which opposes the storage capacitor electrode with an insulating layer therebetween, and a transistor having a source electrode electrically connected to the storage capacitor electrode and a drain electrode electrically connected to the sub pixel electrode. After the data voltage is applied to the liquid crystal layers of the sub pixels, the liquid crystal display device may preferably connect the source electrode and the drain electrode of the transistor so as to change the voltage to be applied to the liquid crystal layer of the boundary-proximity sub pixel, thereby decreasing the transmittance of the liquid crystal layer of the boundary-proximity sub pixel.

With the above-described configuration, after the data voltage is applied to the liquid crystal layers of the sub pixels, the liquid crystal display device connects the source electrode and the drain electrode of the transistor so as to change the voltage to be applied to the liquid crystal layer of the boundary-proximity sub pixel, thereby decreasing the transmittance of the liquid crystal layer of the boundary-proximity sub pixel. Accordingly, with a simple configuration in which the boundary-proximity sub pixel includes a transistor, the occurrence of crosstalk can be suppressed without increasing the number of data bus lines.

A display apparatus of the present invention is a display apparatus including the above-described liquid crystal display device. The display apparatus displays an image which is viewable three-dimensionally in the first display mode.

In the display apparatus configured as described above, in the first display mode, an image which is viewable three-dimensionally is displayed, thereby suppressing the occurrence of crosstalk.

A driving method of the present invention is a driving method for driving a liquid crystal display device that is capable of performing display in a first display mode and a second display mode, the liquid crystal display device including: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel. The liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel. The data voltage in the first display mode is set so that a maximum value of the transmittance of the liquid crystal layers of the sub pixels in the first display mode will be smaller than a maximum value of the transmittance of the liquid crystal layers of the sub pixels in the second display mode.

In the above-described driving method of the present invention, the liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel.

Accordingly, the number of data bus lines for applying a data voltage can be reduced to a smaller number than in a known configuration in which it is necessary to apply data voltages separately to the boundary-proximity sub pixel and sub pixels other than the boundary-proximity sub pixel. More specifically, if each pixel has two sub pixels, by using the liquid crystal display device driven by the above-described driving method, the number of data bus lines can be reduced by substantially half of that of the known configuration.

In the liquid crystal display device driven by the above-described driving method, the data voltage in the first display mode is set so that the maximum value of the transmittance of the liquid crystal layers of the sub pixels in the first display mode will be smaller than the maximum value of the transmittance of the liquid crystal layers of the sub pixels in the second display mode. Accordingly, the brightness presented by the boundary-proximity sub pixel in the first display mode is smaller than that in the second display mode.

Thus, in the first display mode, the occurrence of crosstalk caused by an image displayed by using boundary-proximity sub pixels when displaying an image which is viewable three-dimensionally using the patterned retarder system can be suppressed.

In the second display mode, as well as the first display mode, in each pixel, the brightness presented by the boundary-proximity sub pixel is smaller than that of pixels other than the boundary-proximity sub pixel, thereby improving viewing angle characteristics in the second display mode.

The present invention is not restricted to the above-described embodiments. Various modifications may be made within the scope of claims, and an embodiment obtained by suitably combining technical means disclosed in the different embodiments is encompassed in the technical scope of the present invention.

INDUSTRIAL APPLICABILITY

The present invention can be suitably applied to a liquid crystal display device that may display images three-dimensionally by using a patterned retarder system.

REFERENCE SIGNS LIST 1 liquid crystal display device
100 liquid crystal panel
200 patterned retarder (optical panel)
2 gate bus line
4 source bus line
6 CS bus line
8 R pixel (pixel)
8a bright pixel of R pixel (sub pixel)
8b intermediate pixel of R pixel (sub pixel)
8c dark pixel of R pixel (sub pixel, boundary-proximity sub pixel)
10 G pixel (pixel)
10a bright pixel of G pixel (sub pixel)
10b intermediate pixel of G pixel (sub pixel)
10c dark pixel of G pixel (sub pixel, boundary-proximity sub pixel)
12 B pixel (pixel)
12a bright pixel of B pixel (sub pixel)
12b intermediate pixel of B pixel (sub pixel)
12c dark pixel of B pixel (sub pixel, boundary-proximity sub pixel)
TFT1R to TFT5R thin-film transistor (transistor)
TFT1G to TFT5G thin-film transistor (transistor)
TFT1B to TFT5B thin-film transistor (transistor)
Clc1R, Clc2R, Clc3R liquid crystal capacitor
Clc1G, Clc2G, Clc3G liquid crystal capacitor
Clc1B, Clc2B, Clc3B liquid crystal capacitor
Cd2R, Cd3R storage capacitor
Cd2G, Cd3G storage capacitor
Cd2B, Cd3B storage capacitor
RR retarder plate
RL retarder plate
LUT1 look-up table
LUT2 look-up table

The invention claimed is:
1. A liquid crystal display device that is capable of performing display in a first display mode and a second display mode, comprising:
a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and
an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel, wherein:

the liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel;

a maximum value of the transmittance of the liquid crystal layers of the sub pixels in the first display mode is smaller than a maximum value of the transmittance of the liquid crystal layers of the sub pixels in the second display mode;

the boundary-proximity sub pixel further includes one storage capacitor defined by a storage capacitor electrode and a storage capacitor common electrode which opposes the storage capacitor electrode with an insulating layer therebetween, and a transistor including a source electrode electrically connected to the storage capacitor electrode and a drain electrode electrically connected to the sub pixel electrode of the boundary-proximity sub pixel; and after the data voltage is applied to the liquid crystal layers of the sub pixels, the liquid crystal display device connects the source electrode and the drain electrode of the transistor so as to change the voltage to be applied to the liquid crystal layer of the boundary-proximity sub pixel, thereby decreasing the transmittance of the liquid crystal layer of the boundary-proximity sub pixel.

2. The liquid crystal display device according to claim 1, wherein:

the number of sub pixels disposed in each of the pixels is three; and after applying the data voltage to the liquid crystal layers of the sub pixels, by changing the voltage to be applied to the liquid crystal layers of the sub pixels, the transmittances of the liquid crystal layers of the sub pixels other than the boundary-proximity sub pixel are made different from each other, as well as decreasing the transmittance of the liquid crystal layer of the boundary-proximity sub pixel.

3. The liquid crystal display device according to claim 1, wherein in each of the pixels, a maximum value of brightness presented by the boundary-proximity sub pixel after the transmittance of the liquid crystal layer of the boundary-proximity sub pixel is decreased is smaller than 20% of a maximum value of brightness presented by the sub pixels other than the boundary-proximity sub pixel.

4. The liquid crystal display device according to claim 1, wherein:

in each of the pixels, a boundary between the boundary-proximity sub pixel and a sub pixel adjacent to the boundary-proximity sub pixel is formed along a direction of rows;

if an angle obtained by projecting an angle between a viewing direction and a direction of a normal to the liquid crystal panel onto a plane having a direction of a normal perpendicular to both the direction of a normal to the liquid crystal panel and a column direction of the liquid crystal panel is equal to or smaller than an angle obtained by projecting an angle between the direction of a normal to the liquid crystal panel and a straight line which passes the boundary between the boundary-proximity sub pixel disposed in a pixel and a sub pixel disposed in the pixel adjacent to the boundary-proximity sub pixel and which passes a portion of the boundary between the first optical plate and the second optical plate positioned closest to the boundary-proximity sub pixel onto the plane having a direction of a normal perpendicular to both the direction of a normal to the liquid crystal panel and a column direction of the liquid crystal panel, in the first display mode, a maximum value of brightness of image light which emits from the boundary-proximity sub pixel in the viewing direction and which passes through one of the first optical plate and the second optical plate of the optical panel, the brightness being obtained after the transmittance of the liquid crystal layer is decreased, is smaller than 20% of a maximum value of brightness of image light which emits in the viewing direction from a pixel that is adjacent to the boundary-proximity sub pixel with the boundary formed in the direction of rows and which passes through the same optical plate as the optical plate through which the image light emitting from the boundary-proximity sub pixel passes.

5. A display apparatus comprising the liquid crystal display device according to claim 1, wherein the display apparatus displays an image which is viewable three-dimensionally in the first display mode.

6. A driving method for driving a liquid crystal display device that is capable of performing display in a first display mode and a second display mode, the liquid crystal display device including: a liquid crystal panel including a plurality of pixels disposed in a matrix form, a plurality of sub pixels disposed in each of the pixels, and a sub pixel electrode disposed in each of the sub pixels and opposing a common electrode with a liquid crystal layer therebetween; and an optical panel including first optical plates which generate outgoing light having a first polarization state from incident light and second optical plates which generate outgoing light having a second polarization state, which is different from the first polarization state, from the incident light, the first optical plates and the second optical plates being formed at positions corresponding to odd-numbered rows and even-numbered rows, respectively, of the liquid crystal panel, wherein:

the liquid crystal display device is driven such that, after applying a common data voltage to liquid crystal layers of the plurality of sub pixels disposed in each of the pixels, a voltage to be applied to the liquid crystal layer of a boundary-proximity sub pixel is changed, the boundary-proximity sub pixel being a sub pixel, among the plurality of sub pixels, which is positioned closest to a boundary between the associated first optical plate and the associated second optical plate, thereby decreasing the transmittance of the liquid crystal layer of the boundary-proximity sub pixel;

a maximum value of the transmittance of the liquid crystal layers of the sub pixels in the first display mode is smaller than a maximum value of the transmittance of the liquid crystal layers of the sub pixels in the second display mode;

the boundary-proximity sub pixel further includes one storage capacitor defined by a storage capacitor electrode and a storage capacitor common electrode which opposes the storage capacitor electrode with an insulating layer therebetween, and a transistor including a source electrode electrically connected to the storage capacitor electrode and a drain electrode electrically connected to the sub pixel electrode of the boundary-proximity sub pixel; and after the data voltage is applied to the liquid crystal layers of the sub pixels, the liquid crystal display device connects the source electrode and the drain electrode of the transistor so as to change the voltage to be applied to the liquid crystal layer of the boundary-proximity sub pixel, thereby decreasing the transmittance of the liquid crystal layer of the boundary-proximity sub pixel.

* * * * *